US012386278B2

(12) United States Patent
Yamamoto et al.

(10) Patent No.: US 12,386,278 B2
(45) Date of Patent: Aug. 12, 2025

(54) TONER AND METHOD FOR PRODUCING TONER

(71) Applicant: CANON KABUSHIKI KAISHA, Tokyo (JP)

(72) Inventors: Yuna Yamamoto, Tokyo (JP); Shohei Shibahara, Shizuoka (JP); Kenji Aoki, Shizuoka (JP); Tsutomu Shimano, Shizuoka (JP); Takashi Matsui, Shizuoka (JP); Takayuki Toyoda, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 17/545,755

(22) Filed: Dec. 8, 2021

(65) Prior Publication Data

US 2022/0187725 A1 Jun. 16, 2022

(30) Foreign Application Priority Data

Dec. 15, 2020 (JP) ................................ 2020-207876
Sep. 30, 2021 (JP) ................................ 2021-160969

(51) Int. Cl.
*G03G 9/087* (2006.01)
*G03G 9/08* (2006.01)

(52) U.S. Cl.
CPC ......... *G03G 9/08724* (2013.01); *G03G 9/081* (2013.01); *G03G 9/08782* (2013.01)

(58) Field of Classification Search
CPC ............... G03G 9/08724; G03G 9/081; G03G 9/08782; G03G 9/08722; G03G 9/0802; G03G 9/09314
See application file for complete search history.

(56) References Cited

U.S. PATENT DOCUMENTS 9,575,426 B2 * 2/2017 Shimano ............ G03G 9/09371
2020/0041922 A1 * 2/2020 Shimano ............ G03G 9/08755

FOREIGN PATENT DOCUMENTS

CN 103562799 A 2/2014
CN 104345589 A 2/2015
(Continued)

OTHER PUBLICATIONS

Zhen Jiang, et al., Analysis of influencing factors on the low-temperature fusing performance, Thermosetting Resin, vol. 26, No. 5, Sep. 2011.
(Continued)

*Primary Examiner* — Stewart A Fraser
(74) *Attorney, Agent, or Firm* — Canon U.S.A., Inc. IP Division

(57) ABSTRACT

A toner contains a toner particle containing a resin component and a wax. The resin component contains a vinyl polymer A having a monomer unit A represented by the formula (A):

(A)

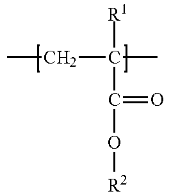

In a luminance histogram created from STEM observation, the total pixel value C in luminance 0 to 9 and the total pixel value A in luminance 0 to 245 satisfy 0.000≤C/A≤0.250. When the pixel value in luminance 10 to 245 has a maxi-
(Continued)

mum value P at luminance X, luminance M-luminance N ranges from 120 to 235, wherein the luminance M denotes a luminance at which the pixel value falls below 20% of P for the first time from the luminance X to 245, and the luminance N denotes a luminance at which the pixel value falls below 20% of the P for the first time from the luminance X to 10.

10 Claims, 2 Drawing Sheets

(56) References Cited

FOREIGN PATENT DOCUMENTS

| | | | |
|---|---|---|---|
| CN | 109856932 | A | 6/2019 |
| CN | 110597032 | A | 12/2019 |
| JP | 2014-130243 | A | 7/2014 |
| JP | 2017194534 | A | 10/2017 |
| JP | 2018173499 | A | 11/2018 |

OTHER PUBLICATIONS

Yu Guan, et al., The influence of monomer copolymerization on the performance of phase change microcapsules, shtexcloud.com, 2018 No. 4, pp. 32-36.

* cited by examiner

TONER AND METHOD FOR PRODUCING TONER

BACKGROUND OF THE INVENTION

Field of the Invention

The present disclosure relates to a toner for use in an electrophotographic image-forming apparatus.

Description of the Related Art

In recent years, there has been an increasing demand for energy-saving electrophotographic image-forming apparatuses. For energy conservation, a technique for fixing toner at low temperature is studied to reduce power consumption in a fixing step.

The low-temperature fixability of toner may be improved by a method of lowering the glass transition point of a resin component of the toner. However, lowering the glass transition point of the resin component reduces the high-temperature storage stability of the toner. Thus, this method is unlikely to satisfy both the low-temperature fixability and the high-temperature storage stability of the toner.

To satisfy both the low-temperature fixability and the high-temperature storage stability of the toner, a method of using a crystalline resin in the toner is investigated. Amorphous resins generally used as resin components of toner have no distinct endothermic peak in measurement with a differential scanning calorimeter (DSC). By contrast, crystalline resins have an endothermic peak in DSC measurement. Due to a regular arrangement of intermolecular or intramolecular alkyl groups, crystalline resins rarely soften below their melting points. In crystalline resins with such properties, crystals melt rapidly (sharp melt) at the melting point, and this rapidly decreases the viscosity.

Due to such a sharp melt property, crystalline resins attract attention as materials that satisfy both the low-temperature fixability and the high-temperature storage stability of toner. One known crystalline resin is a crystalline vinyl resin. The crystalline vinyl resin is a vinyl polymer having a monomer unit with a long-chain alkyl group. More specifically, the crystalline vinyl resin has a main chain backbone and long-chain alkyl groups as side chains. Due to regularly arranged long-chain alkyl groups of the side chains, the crystalline vinyl resin has crystallinity and can be crystallized.

Japanese Patent Laid-Open No. 2014-130243 discloses a toner containing a crystalline vinyl resin having a monomer unit with a long-chain alkyl group.

The present inventors have studied the toner disclosed in Japanese Patent Laid-Open No. 2014-130243 and have found that further improvement in the endurance of the toner is beneficial. More specifically, it has been found that a combined use of the crystalline vinyl resin having a monomer unit with a long-chain alkyl group and a wax may easily cause cracking or chipping of the toner.

SUMMARY OF THE INVENTION

One aspect of the present disclosure is directed to providing a toner that can have good low-temperature fixability, high-temperature storage stability, and releasability, as well as high endurance.

The present disclosure provides a toner including a toner particle containing a resin component and a wax. The resin component contains a vinyl polymer A having a monomer unit A represented by the formula (A):

(A)

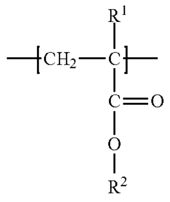

wherein $R^1$ denotes H or $CH_3$, and $R^2$ denotes an alkyl group having 18 to 36 carbon atoms, In scanning transmission electron microscopy observation of a cross section of the toner particle, a backscattered electron image of the cross section of the toner particle is acquired, a luminance of each pixel constituting the backscattered electron image is assigned to one of 256 tones in the luminance range of 0 to 255, and a luminance histogram with a horizontal axis representing the luminance and a vertical axis representing a pixel value is created, a total pixel value C in the luminance range of 0 to 9 and a total pixel value A in the luminance range of 0 to 245 satisfy the formula (1):

$$0.000 \le C/A \le 0.250 \quad (1)$$

and when the pixel value in the luminance range of 10 to 245 in the histogram has a maximum value P at a luminance X, luminance M-luminance N ranges from 120 to 235, wherein the luminance M denotes a luminance at which the pixel value falls below 20% of the maximum value P for the first time from the luminance X to the luminance of 245, and the luminance N denotes a luminance at which the pixel value falls below 20% of the maximum value P for the first time from the luminance X to the luminance of 10.

One aspect of the present disclosure can provide a toner that can have good low-temperature fixability, high-temperature storage stability, and releasability, as well as high endurance.

Further features of the present disclosure will become apparent from the following description of exemplary embodiments with reference to the attached drawings.

DESCRIPTION OF THE EMBODIMENTS

Unless otherwise specified, the numerical range " . . . or more and . . . or less" or " . . . to . . . ", as used herein, refers to the numerical range including the lower limit and the upper limit. For stepwise numerical ranges, the upper limit and the lower limit of each numerical range may be arbitrarily combined.

A (meth)acrylate refers to an acrylate and/or a methacrylate, and a (meth)acrylic acid refers to an acrylic acid and/or a methacrylic acid.

A monomer unit is a unit constituting a polymer and refers to the form of a monomer (a polymerizable monomer) after reaction. For example, one carbon-carbon bond region in a main chain of a polymer formed by polymerization of a vinyl monomer is one monomer unit. The vinyl monomer can be represented by the formula (Z). A vinyl monomer unit is a constitutional unit of a polymer and is the form of a monomer represented by the formula (Z) after reaction. The monomer unit may be referred to simply as a "unit".

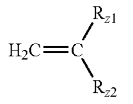

(Z)

In the formula (Z), $R_{Z1}$ denotes a hydrogen atom or an alkyl group, and $R_{Z2}$ denotes an optional substituent. The term "crystalline resin" refers to a resin that has a distinct endothermic peak in differential scanning calorimeter (DSC) measurement of the resin, toner particle, or toner (the differential scanning calorimeter measurement is also referred to as DSC measurement).

The crystallized state of a mixture of crystallites of two or more substances is referred to as a eutectic state.

<Circumstances Leading Up to the Present Disclosure and Presumed Mechanism by which the Advantages of the Present Disclosure are Provided>

The present inventors consider the reason why further improvement in endurance is required for the toner according to Patent Literature 1 as described below.

A toner containing, as a resin component, a polymer having a monomer unit with a long-chain alkyl group tends to have good low-temperature fixability and high-temperature storage stability. This is probably because long-chain alkyl groups in side chains of the polymer are regularly arranged and easily increase crystallinity. This can be an advantageous characteristic to reduce the heat quantity required in a fixing step in an electrophotographic image-forming process.

However, it has been found that the addition of wax to the toner to improve releasability may impair the endurance of the toner. More specifically, it has been found that the toner may easily have cracking or chipping. The reason for cracking or chipping of the toner is that the resin component and the wax in the toner particle may easily crystallize independently, and a wax domain having a clear boundary with the resin component may be easily formed.

Figure 2:
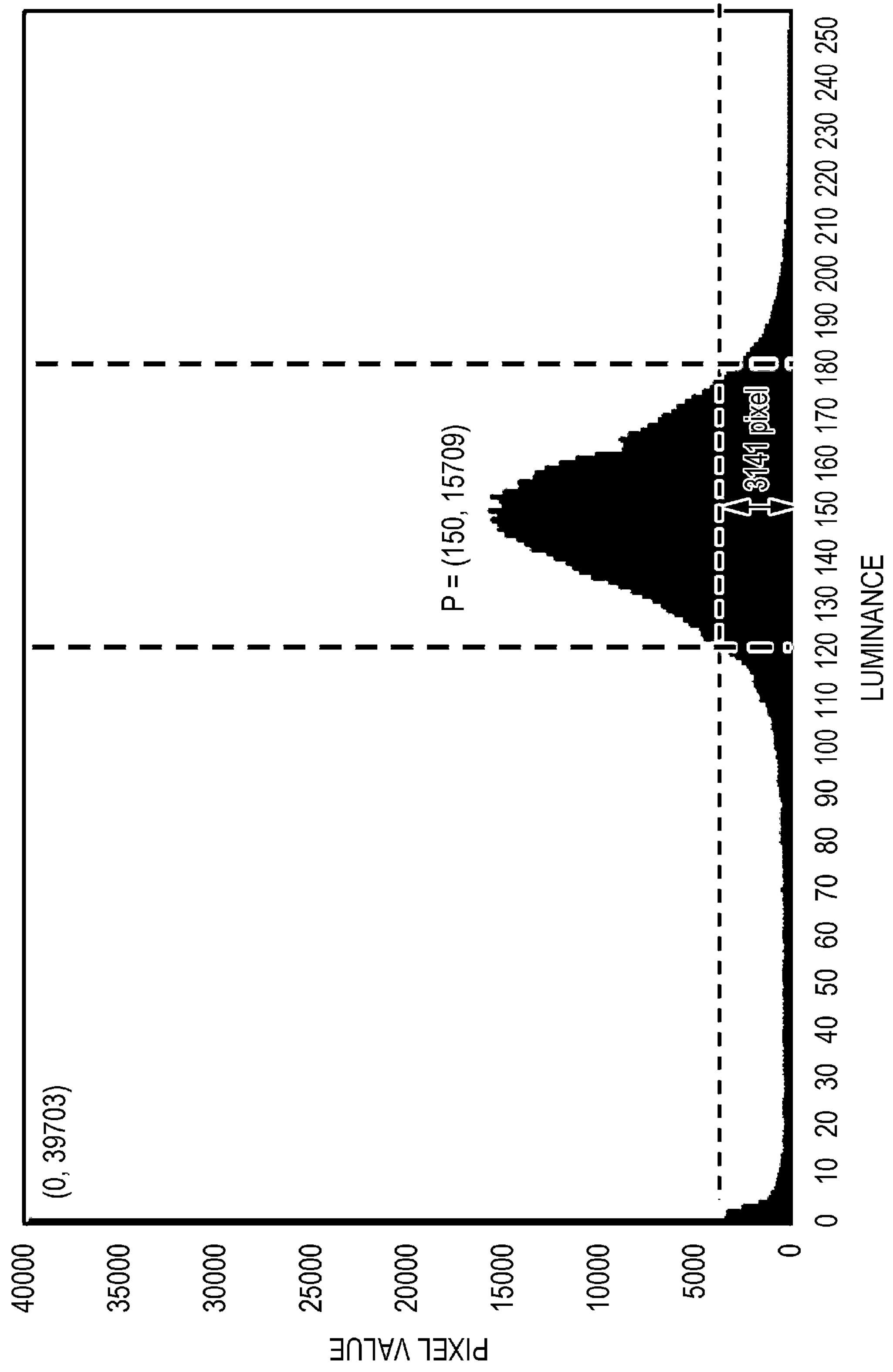
FIG. 2 is an example of a luminance histogram of 256 tones created from a cross-sectional image of a toner particle of toner 35 in an exemplary embodiment of the present disclosure.

In a luminance histogram of a cross section of the toner particle, a low luminance peak corresponding to the wax and a high luminance peak corresponding to the crystalline vinyl resin having a monomer unit with a long-chain alkyl group were independently observed. FIG. 2 shows an example of the luminance histogram. This shows that the resin component and the wax in the toner particle had clear boundaries and were independent.

Thus, the present inventors have come up with the idea of forming a eutectic mixture of the wax and the resin component to make it difficult to separate the peak corresponding to the resin component from the peak corresponding to the wax and thereby broadening the peak of the resin component in a luminance histogram of a cross section of the toner particle. The present inventors have thought that this makes it difficult for the resin component and the wax to have clear boundaries without impairing releasability exhibited by the wax and makes it easy to produce a toner with high endurance.

As a result of investigations based on these considerations, the present inventors have found that a toner with the above constituent features tends to have good low-temperature fixability, high-temperature storage stability, and releasability, as well as high endurance. The constituent features are described in detail below.

<Luminance Histogram of Cross Section of Toner Particle>

A toner is characterized in that, in a luminance histogram according to the present disclosure created by scanning transmission electron microscopy observation, when the pixel value in the luminance range of 10 to 245 in the histogram has a maximum value P at a luminance X, luminance M-luminance N ranges from 120 to 235, wherein the luminance M denotes a luminance at which the pixel value falls below 20% of the maximum value P for the first time from the luminance X to the luminance of 245, and the luminance N denotes a luminance at which the pixel value falls below 20% of the maximum value P for the first time from the luminance X to the luminance of 10.

Under the conditions for acquiring a cross-sectional image of a toner particle described later, in a dark-field image of a cross section of the toner particle, a portion including the wax is dark, and a portion including the resin component is relatively bright. The luminance of each pixel constituting the toner particle cross-sectional image is assigned to one of 256 tones in the luminance range of 0 to 255 to create a luminance histogram with the horizontal axis representing luminance and the vertical axis representing the pixel value. The pixel value in the luminance range of 10 to 245 between the darkest luminance of 0 and the brightest luminance of 255 in the luminance histogram has a maximum value P at a luminance X. The luminance X at the maximum value P in the above range is a luminance at which the pixel value is the maximum among luminance values corresponding to a portion composed mainly of the resin component of the toner. As described later, a luminance histogram in the present disclosure is created from an image acquired when the luminance X is 150. More specifically, the luminance histogram can be created when the luminance at the maximum pixel value is 150 among luminance values corresponding to a portion composed mainly of the resin component. A luminance in the luminance histogram corresponding to the portion composed mainly of the resin component can be determined by matching the luminance histogram with the toner particle cross-sectional image. This is because a portion occupying the largest region in the toner particle cross-sectional image generally corresponds to the resin component.

Pixels with a luminance of 246 or more may have a noise, such as a white area, and are excluded.

In the luminance histogram, a lower luminance indicates darker, and a higher luminance indicates brighter. Thus, pixels in the luminance range of 0 to 9 correspond to an independent wax. Pixels in the luminance range of 10 to 245 correspond to the resin component and a eutectic structure of the wax and the resin component. The term "independent wax", as used herein, refers to a wax having a clear boundary with the resin component.

Furthermore, luminance M-luminance N ranges from 120 to 235, wherein the luminance M denotes a luminance at which the pixel value falls below 20% of the maximum value P for the first time from the luminance X to the luminance of 245, and the luminance N denotes a luminance at which the pixel value falls below 20% of the maximum value P for the first time from the luminance X to the luminance of 10.

The value of luminance M-luminance N indicates how broad the peak having the maximum pixel value P at the luminance X is. A larger value of luminance M-luminance N indicates a larger number of eutectic structures of the wax and the resin component in the toner particle. The eutectic structure in the toner particle possibly prevents the resin component and the wax from having a clear boundary without impairing the releasability of the toner, and the toner can easily have high endurance.

More specifically, when the value of luminance M-luminance N is 120 or more, the toner can easily have high releasability and endurance. Thus, the value of luminance M-luminance N is 120 or more, preferably 150 or more. The upper limit is, but not limited to, 235 or less, more preferably 200 or less, still more preferably 180 or less.

When the value of luminance M-luminance N is 119 or less, the releasability or endurance may be insufficient. A small value of luminance M-luminance N may result from the following (1) and/or (2). (1) The wax and the resin component are completely mixed together in the toner particle. (2) In the toner particle, the wax has a clear boundary in the resin component.

In the case of (1), a sharp peak corresponding to a mixture of the wax and the resin component is observed in the luminance histogram. The mixture of the wax and the resin component has a fewer starting points of cracking or chipping of the toner, which is advantageous for endurance. However, the wax mixed with the resin component is less likely to bleed to the toner surface while fixing and tends to result in lower releasability.

In the case of (2), as described above, the toner is likely to have cracking or chipping and lower endurance.

The value of luminance M-luminance N may be controlled in the above range via the type and addition amount of the wax or by heat treatment to form a eutectic mixture of the wax and the resin component.

In the heat treatment, the wax and the resin component may be heated to a molten state and subsequently may be maintained at a temperature at which the wax crystallizes preferentially. More specifically, the wax and the resin component may be maintained at a temperature lower than the melting point of the wax and higher than the melting point of the resin component. In such a case, crystallization proceeds under conditions suitable for the wax in the mixture of the wax and the resin component, and the toner particle can easily have a eutectic structure.

Even without the heat treatment, the use of a large amount of ester wax with a plurality of long-chain alkyl groups and with a branched structure, such as dipentaerythritol hexabehenate, may result in the value of luminance M-luminance N in a preferable range.

In the luminance histogram, the total pixel value C in the luminance range of 0 to 9 and the total pixel value A in the luminance range of 0 to 245 satisfy the formula (1):

$$0.000 \leq C/A \leq 0.250 \quad (1)$$

As described above, in the luminance histogram, the total pixel value in the luminance range of 0 to 9 corresponds to the independent wax. Satisfying the formula (1), that is, a smaller amount of independent wax in the toner particle results in a fewer starting points of cracking or chipping of the toner and tends to result in a toner with high endurance. The formula (2), (3), or (4) can be satisfied.

$$0.000 \leq C/A \leq 0.100 \quad (2)$$

$$0.000 \leq C/A \leq 0.080 \quad (3)$$

$$0.000 \leq C/A \leq 0.040 \quad (4)$$

<Resin Component>

The resin component can be a binder resin. More specifically, the toner can have a toner particle containing the binder resin and the wax, and the binder resin can contain a vinyl polymer A having a monomer unit A represented by the formula (A).

<Vinyl Polymer A and Monomer Unit A>

The vinyl polymer A has a monomer unit A represented by the formula (A):

(A)

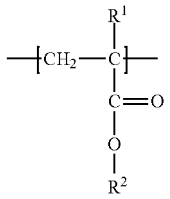

wherein $R^1$ denotes H or $CH_3$, and $R^2$ denotes an alkyl group having 18 to 36 carbon atoms.

The long-chain alkyl group (the alkyl group having 18 to 36 carbon atoms) of the monomer unit A of the vinyl polymer A in a side chain of the vinyl polymer A tends to increase the crystallinity of the vinyl polymer A and tends to provide a toner with good low-temperature fixability and high-temperature storage stability. Furthermore, the vinyl polymer A can be a crystalline resin with a distinct endothermic peak in DSC measurement.

The monomer unit A can be incorporated as a monomer unit of the vinyl polymer A by vinyl polymerization of a polymerizable (meth)acrylate monomer with an alkyl group having 18 to 36 carbon atoms.

Examples of the (meth)acrylate with an alkyl group having 18 to 36 carbon atoms include (meth)acrylates with a linear alkyl group having 18 to 36 carbon atoms [such as stearyl (meth)acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth)acrylate, myricyl (meth)acrylate, and dotriacontyl (meth)acrylate] and (meth)acrylates with a branched alkyl group having 18 to 36 carbon atoms [such as 2-decyltetradecyl (meth)acrylate].

Among these, from the perspective of the low-temperature fixability and high-temperature storage stability of toner, the (meth)acrylate with an alkyl group having 18 to 36 carbon atoms can be a (meth)acrylate with a linear alkyl group having 18 to 36 carbon atoms, a (meth)acrylate with a linear alkyl group having 18 to 30 carbon atoms, or a linear stearyl (meth)acrylate or a linear behenyl (meth)acrylate. Thus, in the formula (A), $R^2$ preferably denotes a linear alkyl group having 18 to 36 carbon atoms, more preferably a linear alkyl group having 18 to 30 carbon atoms, still more preferably an alkyl group having 18 or 22 carbon atoms. $R^1$ can be hydrogen.

A polymerizable monomer forming the monomer unit A (hereinafter also referred to as a monomer (a)) or the monomer unit A may be used alone or in combination of two or more thereof.

The monomer unit A content of the vinyl polymer A preferably ranges from 20.0% to 80.0% by mass. When the monomer unit A content is 20.0% or more by mass, the toner tends to have good low-temperature fixability and high-temperature storage stability. Thus, the monomer unit A content is preferably 20.0% or more by mass, more preferably 40.0% or more by mass, still more preferably 45.0% or more by mass. When the monomer unit A content is 80.0% or less by mass, the toner tends to have appropriate elasticity. Thus, the monomer unit A content is preferably 80.0% or less by mass, more preferably 75.0% or less by mass, still more preferably 60.0% or less by mass.

The monomer unit A content is the total amount of all monomer units represented by the formula (A). The same applies to a plurality of monomers (a).

The vinyl polymer A content of the resin component is preferably 30.0% or more by mass. When the vinyl polymer A content is 30.0% or more by mass, the toner tends to have good low-temperature fixability and high-temperature storage stability. Thus, the vinyl polymer A content is preferably 30.0% or more by mass, more preferably 40.0% or more by mass, still more preferably 60.0% or more by mass, still more preferably 80.0% or more by mass. Still more preferably, the vinyl polymer A content is 100.0% by mass, that is, the resin component is the vinyl polymer A alone. The upper limit is, but not limited to, 100.0% by mass.

The vinyl polymer A preferably has a weight-average molecular weight (Mw) in the range of 10,000 to 200,000, more preferably 20,000 to 150,000, still more preferably 40,000 to 70,000. Mw in the above range tends to result in a toner with appropriately controlled elasticity.

Furthermore, from the perspective of low-temperature fixability, the vinyl polymer A preferably has a melting point in the range of 50° C. to 80° C.

<Other Monomer Units>

To appropriately control the physical properties of the toner, the vinyl polymer A can have a monomer unit other than the monomer unit A.

For a vinyl polymer A having another monomer unit, a corresponding polymerizable monomer (hereinafter also referred to as another monomer) may be incorporated by vinyl polymerization as a monomer unit of the vinyl polymer A.

Examples of the other monomer include the following monomers, which may be used alone or in combination.

- Monomers with a nitrile group, such as acrylonitrile and methacrylonitrile.
- Monomers with a hydroxy group, such as 2-hydroxyethyl (meth)acrylate and 2-hydroxypropyl (meth)acrylate.
- Monomers with an amide group, such as acrylamides and monomers produced by reacting an amine having 1 to 30 carbon atoms with a carboxylic acid having an ethylenically unsaturated bond and having 2 to 30 carbon atoms (an acrylic acid, a methacrylic acid, etc.).
- Monomers with a urethane group: for example, monomers produced by reacting an alcohol having an ethylenically unsaturated bond and having 2 to 22 carbon atoms (2-hydroxyethyl methacrylate, vinyl alcohol, etc.) with an isocyanate having 1 to 30 carbon atoms [a monoisocyanate compound (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, 2,6-dipropylphenyl isocyanate, etc.), an aliphatic diisocyanate compound (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethylhexamethylene diisocyanate, etc.), an alicyclic diisocyanate compound (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, etc.), an aromatic diisocyanate compound (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, etc.), or the like]; and monomers produced by reacting an alcohol having 1 to 26 carbon atoms (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, elaidyl alcohol, oleyl alcohol, linoleyl alcohol, linolenyl alcohol, nonadecyl alcohol, heneicosanol, behenyl alcohol, erucyl alcohol, etc.) with an isocyanate having an ethylenically unsaturated bond and having 2 to 30 carbon atoms [2-isocyanatoethyl (meth)acrylate, 2-(0-[1'-methylpropylideneamino]carboxyamino)ethyl (meth)acrylate, 2-[(3,5-dimethylpyrazolyl)carbonylamino]ethyl (meth) acrylate, 1,1-(bis(meth)acryloyloxymethyl)ethyl isocyanate, etc.].
- Monomers with a urea group: for example, monomers produced by reacting an amine having 3 to 22 carbon atoms [a primary amine (n-butylamine, t-butylamine, propylamine and isopropylamine, etc.), a secondary amine (di-n-ethylamine, di-n-propylamine, di-n-butylamine, etc.), aniline, cyclohexylamine, etc.] with an isocyanate having an ethylenically unsaturated bond and having 2 to 30 carbon atoms.
- Vinyl esters: for example, vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate, and vinyl octanoate.
- Monomers with a carboxy group; for example, methacrylic acid, acrylic acid, and 2-carboxyethyl (meth) acrylate.
- (Meth)acrylates, such as methyl (meth)acrylate, ethyl (meth)acrylate, n-butyl (meth)acrylate, t-butyl (meth) acrylate, and 2-ethylhexyl (meth)acrylate
- styrene
- α-methylstyrene In particular, monomers with a nitrile group can be used. These monomers can be used to easily control the melting point without excessively lowering the crystallinity of the vinyl polymer A and to produce a toner with good low-temperature fixability and high-temperature storage stability. Furthermore, ethyl methacrylate, n-butyl methacrylate, t-butyl methacrylate, or styrene can be used to appropriately control the elasticity of the toner.

<Resins Other than Vinyl Polymer A>

The resin component of the toner other than the vinyl polymer A may be a vinyl resin other than the vinyl polymer A, a polyester, a polyurethane, or an epoxy resin. In particular, from the perspective of electrophotographic characteristics, a vinyl resin other than the vinyl polymer A, a polyester, or a polyurethane can be used.

Monomers constituting the vinyl resin other than the vinyl polymer A may be the above monomers other than the monomer (a). If necessary, two or more of these monomers may be used in combination.

The polyester can be produced by a condensation polymerization reaction of a divalent or polyvalent carboxylic acid (polycarboxylic acid) and a polyhydric alcohol.

Examples of the polycarboxylic acid include dibasic acids, such as succinic acid, adipic acid, sebacic acid, phthalic acid, isophthalic acid, terephthalic acid, malonic acid, and dodecenylsuccinic acid, and anhydrides and lower alkyl esters thereof; aliphatic unsaturated dicarboxylic acids, such as maleic acid, fumaric acid, itaconic acid, and citraconic acid; and 1,2,4-benzenetricarboxylic acid and 1,2,5-benzenetricarboxylic acid, and anhydrides and lower alkyl esters thereof. These may be used alone or in combination.

Examples of the polyhydric alcohol include alkylene glycols (ethylene glycol, 1,2-propylene glycol, and 1,3-propylene glycol); alkylene ether glycols (poly(ethylene glycol) and poly(propylene glycol)); alicyclic diols (1,4-cyclohexanedimethanol); bisphenols (bisphenol A); and alkylene oxide (ethylene oxide and propylene oxide) adducts of alicyclic diols. The alkyl moieties of the alkylene glycols and the alkylene ether glycols may be linear or branched. In the present disclosure, alkylene glycols with a branched structure can also be used. Further examples include glycerin, trimethylolethane, trimethylolpropane, and pentaerythritol. These may be used alone or in combination.

To adjust the acid value and the hydroxyl value, if necessary, a monobasic acid, such as acetic acid or benzoic acid, or a monohydric alcohol, such as cyclohexanol or benzyl alcohol, may be used.

The polyester may be produced by any method, for example, a transesterification method or a direct polycondensation method.

The polyurethane may be produced by a reaction between a diol component and a diisocyanate component.

Examples of the diisocyanate component include aromatic diisocyanates having 6 to 20 carbon atoms (excluding the carbon atom of the NCO group; the same applies hereinafter), aliphatic diisocyanates having 2 to 18 carbon atoms, and alicyclic diisocyanates having 4 to 15 carbon atoms, and modified products of these diisocyanates (modified products with a urethane group, a carbodiimide group, an allophanate group, a urea group, a biuret group, a uretdione group, a uretonimine group, an isocyanurate group, or an oxazolidone group; hereinafter also referred to as "modified diisocyanates"), and mixtures of two or more thereof.

Examples of the aromatic diisocyanates include m- and/or p-xylylene diisocyanate (XDI) and α,α,α',α'-tetramethylxylylene diisocyanate.

Examples of the aliphatic diisocyanates include ethylene diisocyanate, tetramethylene diisocyanate, hexamethylene diisocyanate (HDI), and dodecamethylene diisocyanate.

Examples of the alicyclic diisocyanates include isophorone diisocyanate (IPDI), dicyclohexylmethane-4,4'-diisocyanate, cyclohexylene diisocyanate, and methylcyclohexylene diisocyanate.

In particular, aromatic diisocyanates having 6 to 15 carbon atoms, aliphatic diisocyanates having 4 to 12 carbon atoms, and alicyclic diisocyanates having 4 to 15 carbon atoms can be used. In particular, XDI, IPDI, and HDI can be used.

In addition to the diisocyanate component, a tri or higher isocyanate compound can also be used.

The diol component that can be used for the polyurethane may be a dihydric alcohol that can be used for the polyester.

<Wax>

The wax in the toner particle can be an ester wax. One or two or more ester waxes may be used.

The ester wax in the present disclosure only needs to have at least one ester bond in its molecule and may be a natural ester wax or a synthetic ester wax.

Examples of the ester wax include, but are not limited to:

esters of a monohydric alcohol and a monocarboxylic acid, such as behenyl behenate, stearyl stearate, and palmityl palmitate;

esters of a divalent carboxylic acid and a monoalcohol, such as dibehenyl sebacate;

esters of a dihydric alcohol and a monocarboxylic acid, such as ethylene glycol distearate and hexanediol dibehenate;

esters of a trihydric alcohol and a monocarboxylic acid, such as glycerin tribehenate;

esters of a tetrahydric alcohol and a monocarboxylic acid, such as pentaerythritol tetrastearate and pentaerythritol tetrapalmitate;

esters of a hexahydric alcohol and a monocarboxylic acid, such as dipentaerythritol hexastearate, dipentaerythritol hexapalmitate, and dipentaerythritol hexabehenate;

esters of a polyfunctional alcohol and a monocarboxylic acid, such as polyglycerol behenate; and natural ester waxes, such as carnauba wax and rice wax.

The ester wax can be an ester of an alcohol and an aliphatic monocarboxylic acid. The number Ac of carbon atoms in the linear alkyl group denoted by $R^2$ in the monomer unit A and the average number Wc of carbon atoms in a linear alkyl group contained in the ester wax can satisfy the formula (5).

$$|Ac-Wc|\leq 6.0 \quad (5)$$

In the present disclosure, the linear alkyl group does not include an alkylene or a branched alkyl group.

Satisfying the formula (5) facilitates the formation of a eutectic mixture of the ester wax and the vinyl polymer A and facilitates the production of a toner with high releasability and endurance. The present inventors think that the formation of the eutectic mixture of the ester wax and the vinyl polymer A is facilitated because the vinyl polymer A and the wax with linear alkyl chains of such similar lengths can easily form a stable crystal structure not only in a state in which the ester wax and the vinyl polymer A are completely separated and independently crystallized but also in a state in which the ester wax and the vinyl polymer A are entangled with each other. |Ac−Wc| is more preferably 4.0 or less, still more preferably 2.0 or less.

When the monomer unit A has a plurality of linear alkyl groups denoted by $R^2$, Ac is calculated as described below. For example, when $R^2$ in the monomer unit A contains $X_a$ % by mass of a linear alkyl group having $n_a$ carbon atoms and $Y_a$ % by mass of a linear alkyl group having $m_a$ carbon atoms, Ac is calculated using the formula (6):

$$Ac=(n_aX_a+m_aY_a)/100 \quad (6)$$

For a plurality of ester waxes, |Ac−Wc| is calculated for the calculated Ac using Wc of each ester wax, and whether |Ac−Wc| for each ester wax is in the above range is examined. An ester wax with |Ac−Wc| in the above range can be contained. An ester wax with |Ac−Wc| outside the above range may be contained.

In the present disclosure, the ester wax can be an ester of a trihydric or higher polyhydric alcohol and an aliphatic monocarboxylic acid. The ester wax can also be an ester of a tetrahydric or higher polyhydric alcohol and an aliphatic monocarboxylic acid, or an ester of a hexahydric or higher polyhydric alcohol and an aliphatic monocarboxylic acid.

The valence of a trihydric or higher polyhydric alcohol corresponds to the number of branched structures of the ester wax. The use of a wax with a branched structure facilitates the formation of a eutectic mixture of the vinyl polymer A and the wax and tends to improve endurance and releasability. The reason for the facilitated formation of the eutectic mixture is probably that $R^2$ of the monomer unit A in the vinyl polymer A can easily enter a gap between wax crystals due to the branching in the wax. Furthermore, due to $R^2$ in the gap in the wax, the wax in the toner particle can easily have a network structure. Thus, the wax and the resin component are less likely to have a distinct boundary, and have a fewer starting points of cracking or chipping of the toner.

The toner particle can further contain a hydrocarbon wax. One or two or more hydrocarbon waxes may be used.

Examples of the hydrocarbon wax include, but are not limited to:

aliphatic hydrocarbon waxes: low-molecular-weight polyethylene, low-molecular-weight polypropylene, low-molecular-weight olefin copolymers, and Fischer-Tropsch waxes, and waxes produced by oxidation and acid addition of these waxes.

The mass ratio of the wax to the resin component preferably ranges from 1.0% to 25.0% by mass. At a mass ratio of 1.0% or more by mass, the toner tends to have good releasability. Thus, the mass ratio is preferably 1.0% or more by mass, more preferably 2.0% or more by mass, still more preferably 5.0% or more by mass. A mass ratio of 25.0% or less by mass is less likely to result in an excessively large amount of independent wax in the toner particle and cracking or chipping of the toner. Thus, the mass ratio is preferably 25.0% or less by mass, more preferably 20.0% or less by mass, still more preferably 15.0% or less by mass. When the toner particle contains a plurality of waxes, the mass ratio is calculated using the total mass of the waxes.

The wax preferably has a molecular weight in the range of 1000 to 3000. The wax with a molecular weight of 1000 or more is less compatible with the vinyl polymer A, and the toner tends to have good low-temperature fixability, high-temperature storage stability, and releasability. Thus, the molecular weight is preferably 1000 or more, more preferably 1500 or more. At a molecular weight of 3000 or less, the toner can easily maintain appropriate releasability. Thus, the molecular weight is preferably 3000 or less, more preferably 2500 or less.

The wax can have a higher melting point than the vinyl polymer A contained in the toner. When the melting point is controlled as described above, and heat treatment is performed in a toner production process as described later, the toner can easily satisfy the above range of luminance M-luminance N.

The wax preferably has a melting point in the range of 60° C. to 120° C. The wax with a melting point in this range can melt and bleed easily to the surface of the toner particle while fixing. The melting point more preferably ranges from 70° C. to 100° C.

<Core-Shell Structure>

A toner according to the present disclosure may have a core, which contains the resin component and the wax, and a shell phase covering the core.

The shell phase may be formed of the resin other than the vinyl polymer A usable as the resin component as described above. In particular, the vinyl resin or polyester can be used in terms of charging stability.

<Various Additive Agents>

If necessary, the toner may contain one or more additive agents selected from a colorant, a magnetic material, a charge control agent, and a fluidizer. Various additive agents for use in the toner are specifically described below.

<Colorant>

Examples of the colorant include

- yellow colorants, such as condensed azo compounds, isoindolinone compounds, anthraquinone compounds, azo metal complexes, methine compounds, and allylamide compounds; more specifically, C.I. Pigment Yellow 12, 13, 14, 15, 17, 62, 74, 83, 93, 94, 95, 109, 110, 111, 128, 129, 147, 155, 168, and 180;
- magenta colorants, such as condensed azo compounds, diketopyrrolopyrrole compounds, anthraquinone, quinacridone compounds, basic dye lake compounds, naphthol compounds, benzimidazolone compounds, thioindigo compounds, and perylene compounds; more specifically, C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254; and
- cyan colorants, such as copper phthalocyanine compounds and derivatives thereof, anthraquinone compounds, and basic dye lake compounds; more specifically, C.I. Pigment Blue 1, 7, 15, 15:1, 15:2, 15:3, 15:4, 60, 62, and 66.

A colorant for use in a toner according to the present disclosure is selected in terms of hue angle, color saturation, lightness value, light fastness, OHP transparency, and dispersibility in toner particles.

When the colorant is not composed of magnetic particles, 100.0 parts by mass of the resin component preferably contains 1.0 to 20.0 parts by mass of the colorant. When the colorant is composed of magnetic particles, 40.0 to 150.0 parts by mass of the colorant is preferably added to 100.0 parts by mass of the resin component.

<Charge Control Agent>

Any charge control agent may be used.

Examples of a negative charge control agent include

- monoazo metal compounds, acetylacetone metal compounds, aromatic oxycarboxylic acids, aromatic dicarboxylic acids, oxycarboxylic acids, and dicarboxylic acid metal compounds.

Examples of a positive charge control agent include quaternary ammonium salts, polymer compounds having a quaternary ammonium salt in a side chain, guanidine compounds, pyridine compounds, nigrosine compounds, and imidazole compounds.

100.0 parts by mass of toner particles preferably contain 0.01 to 20.0 parts by mass, more preferably 0.5 to 10.0 parts by mass, of the charge control agent.

<External Additives>

Examples of the external additives include

- fine inorganic particles and composite oxides thereof selected from the group consisting of fine silica particles, fine alumina particles, and fine titania particles. Examples of the composite oxides include fine silica aluminum particles and fine strontium titanate particles.
- 100 parts by mass of toner particles preferably contain 0.01 to 8.0 parts by mass, more preferably 0.1 to 4.0 parts by mass, of the external additive.

<Method for Producing Toner>

The toner and toner particles may be produced by any method, including a pulverization process, a suspension polymerization method, an emulsion aggregation method, or a dissolution suspension method. In particular, the suspension polymerization method can be used.

To satisfy the above range of luminance M-luminance N, the vinyl polymer A content and the wax content can be controlled, and toner particles can be heat-treated at a temperature between the melting points of the vinyl polymer A and the wax for 30 minutes or more.

Thus, a method for producing a toner according to the present disclosure includes the steps of producing a toner base particle containing a wax and a resin component, and producing a toner particle by heat treatment of the toner base particle in the temperature range of TmA to TmW for 30 minutes or more, wherein TmW denotes the melting point of the wax, and TmA denotes the melting point of the vinyl polymer A.

To easily satisfy the range of luminance M-luminance N, the vinyl polymer A content of the resin component is preferably 30.0% or more by mass, and the wax content preferably ranges from 1.0% to 25.0% by mass of the mass of the resin component.

Furthermore, at the heat treatment temperature in the range of TmA to TmW, the wax is crystallized more preferentially than the vinyl polymer A, the toner particle easily has a eutectic structure of the wax and the vinyl polymer A, and the value of luminance M-luminance N tends to increase. TmA can be lower than TmW.

Furthermore, the temperature of the toner particle can be TmW or more before the heat-treatment step. In such a case, the vinyl polymer A and the wax in the toner particle can melt easily, and in the subsequent heat-treatment step crystallization proceeds under conditions suitable for the wax in the mixture of the wax and the resin component, and the eutectic structure can be easily formed.

Furthermore, the heat treatment for 30 minutes or more enables the wax in the toner particle to be preferentially and sufficiently crystallized. Thus, 30 minutes or more is preferred, 1 hour or more is more preferred, and 2.5 hours or more is still more preferred. The upper limit is preferably, but not limited to, 5 hours or less.

<Step of Producing Toner Particle>

The step of producing a toner particle can be the step of producing a toner particle by a suspension polymerization method. In the production of a toner particle by the suspension polymerization method, a polymerizable monomer composition containing a polymerizable monomer, a wax, an optional colorant, and the like is added to an aqueous medium, and the polymerizable monomer composition is granulated in the aqueous medium to form a particle of the polymerizable monomer composition. The polymerizable monomer in the particle of the polymerizable monomer composition can be polymerized to produce a resin component and thereby produce the toner particle.

The step of producing a toner particle may be the step of producing a toner particle by a pulverization process. In the production of a toner particle by the pulverization process, first, toner components, such as a resin material containing the vinyl polymer A, the wax, and the optional colorant, are mixed. The mixture is sufficiently mixed in a mixer, such as a Henschel mixer or a ball mill. The mixture is then melted with a hot kneader, such as a roll, a kneader, or an extruder. The materials are dispersed in the kneaded mixture. After cooling and solidification, pulverization and classification are performed to produce toner particles.

The step of producing a toner particle may be the step of producing a toner particle by an emulsion aggregation method. In the production of a toner particle by the emulsion aggregation method, an aqueous dispersion of each of a resin material containing the vinyl polymer A, the wax, an optional colorant, and the like is prepared (an aqueous dispersion step). The aqueous dispersions are then mixed and aggregated to a desired particle size using a metal salt or the like (an aggregation step). The aggregate is heated and fused (a heating and fusion step) and is then subjected to a cooling step and a washing and drying step to produce a toner particle.

The step of producing a toner particle may be the step of producing a toner particle by a dissolution suspension method. In the production of a toner particle by the dissolution suspension method, first, a resin material containing the vinyl polymer A, the wax, the optional colorant, and the like are dissolved or dispersed in an organic solvent (a resin dissolution step). The solution or dispersion liquid is then dispersed in a poor solvent, such as water, approximately to the size of the toner particle to produce a granulated product (droplet) (a granulation step). The toner particle can be produced by distilling off the organic solvent contained in the granulated product (a solvent removal step) followed by washing and drying (a washing and drying step).

<Various Measurement Methods, Etc.>

Various measurement methods and the like are described below.

<Acquisition of Toner Particle Cross-Sectional Image with Scanning Transmission Electron Microscope (STEM)>

The state of wax in a toner particle is examined by observing a cross section of the toner particle with a scanning transmission electron microscope. The cross-sectional observation of the toner particle is performed after ruthenium staining. In other words, a cross-sectional image of a toner particle according to the present disclosure can be a cross-sectional image of a ruthenium stained toner particle.

The procedure for observing a cross section of toner is described below.

Toner dispersed as much as possible is embedded in a visible photocurable resin (D-800, manufactured by Nisshin EM Corporation) and is cut into a thickness of 100 nm with an ultrasonic ultramicrotome (UC7, manufactured by Leica).

A thin sample thus prepared is stained using a vacuum staining apparatus (VSC4R1H, manufactured by Filgen, Inc.) in a 500-Pa $RuO_4$ gas atmosphere for 15 minutes, and an STEM image is acquired with a scanning transmission electron microscope (JEM2800, manufactured by JEOL Ltd.). Due to different degrees of staining of crystallized wax and the resin under the staining conditions, the state of the wax can be examined from the contrast difference. The observation conditions include an accelerating voltage of 200 kV, an STEM probe size of 1 nm, an image size of 1024×1024 pixels, and a magnification of 30,000. A dark-field (STEM-DF) image was acquired. The contrast and brightness are adjusted such that a portion composed mainly of the resin component has the maximum pixel value at a luminance of 150 in a luminance histogram of IMAGE J described below. Furthermore, the luminance of the wax in a cross section of the toner particle is adjusted to be 0.

In this case, to select a toner particle for acquiring a cross-sectional image, after the weight-average particle diameter (D4) of the toner is measured by a measurement method described later, 10 toner particles with a long axis diameter in the range of 0.8 to 1.1 times the D4 are selected. An image is acquired such that two or more toners are not present in the field of the image.

<Luminance Histogram and Physical Properties Obtained from Histogram>

A luminance histogram is created by analyzing the STEM image of the cross section of the toner particle acquired by the above method using image-processing software IMAGE J (developed by Wayne Rashand). Thus, the luminance histogram can be created by measuring a luminance spectrum of 256 tones on the image obtained from image analysis of the cross section of the toner particle. The specific procedure is described below.

First, a backscattered electron image to be analyzed is converted to 8-bit using Type of the Image menu.

Next, a region to be analyzed is specified only inside the contour of toner. The contour of toner is defined by the interface between the visible photocurable resin and the toner cross section. A region outside the region to be analyzed is deleted using Clear Outside of the Edit menu.

Using Filters of the Process menu, the Median size is set to 2.0 pixels to reduce image noise.

Next, Histogram of the Analyze menu is selected to display the luminance histogram in a new window. Numerical values of the luminance histogram are acquired from the List of the window. The following values are calculated from the numerical values.

A luminance width corresponding to 20% or more of the pixel value at the luminance P in the luminance range of 10 to 245

The total pixel value C in the luminance range of 0 to 9 and the total pixel value A in the luminance range of 0 to of 245

When the pixel value in the luminance range of 10 to 245 has the maximum value P at a luminance X of 140 or more and less than 160 in the histogram, the brightness of the STEM image may be adjusted using motion picture editing software Microsoft Photo (Microsoft Corporation). In such a case, the STEM image from which the region outside the region to be analyzed is deleted using IMAGE J is opened in advance using the motion picture editing software Microsoft Photo. Edit is selected from an edit and create menu, and a light cursor on an adjustment screen is moved to adjust the brightness to a luminance X of 150.

The STEM image after the brightness adjustment is opened again using IMAGE J, and an analysis region inside the contour of the toner is selected to create a luminance histogram. Numerical values of the luminance histogram are obtained from the List of the luminance histogram.

When the luminance P is not in the luminance range of 140 or more and less than 160, it is necessary to acquire an STEM image again so that the luminance P is 150.

The same image analysis is performed on 10 STEM images of each toner to calculate the above values. The average of values on the 10 STEM images is used as a physical property of each toner.

<Method for Measuring Various Monomer Unit Contents of Resin>

Various monomer unit contents of resin are measured by $^{1}$H-NMR under the following conditions.

Measuring apparatus: FT NMR JNM-EX400 (manufactured by JEOL Ltd.)

Measurement frequency: 400 MHz

Pulse condition: 5.0 μs

Frequency range: 10,500 Hz

Number of scans: 64

Measurement temperature: 30° C.

Specimen: 50 mg of a sample is put into a sample tube with an inner diameter of 5 mm. Deuterochloroform ($CDCl_3$) is added as a solvent to the sample and is dissolved in a thermostat at 40° C. to prepare a specimen.

A $^{1}$H-NMR chart is analyzed to identify the structure of each monomer unit. Measurement of the monomer unit A content of the vinyl polymer A is described below as an example. In the $^{1}$H-NMR chart, a peak independent of peaks assigned to constituents of another monomer unit is selected from peaks assigned to constituents of the monomer unit A, and the integral value S1 of this peak is calculated. For the other monomer units in the vinyl polymer A, integral values are calculated in the same manner.

When the vinyl polymer A is composed of the monomer unit A and another monomer unit, the monomer unit A content is determined from the integral value S1 and the integral value S2 of the peak of the other monomer unit as described below. n1 and n2 denote the number of hydrogen atoms in a constituent to which a peak of interest is assigned.

$$\text{Monomer unit } A \text{ content (\% by mole)}=\{(S1/n1)/((S1/n1)+(S2/n2))\}\times 100$$

Even for two or more other monomer units, the monomer unit A content can be calculated in the same manner.

When a polymerizable monomer having no hydrogen atom except for a vinyl group is used, $^{13}$C-NMR for the measurement nucleus $^{13}$C is performed in a single pulse mode, and the calculation is performed in the same manner by $^{1}$H-NMR.

The ratio (% by mole) of each unit calculated by the above method is multiplied by the molecular weight of each unit to convert the ratio of each unit into mass percentage.

In the NMR measurement of toner, independent peaks may not be observed due to an overlap between peaks of the wax and resins other than the vinyl polymer A. Thus, the ratio of each unit in the vinyl polymer A may not be calculated. In such a case, a vinyl polymer A' is produced in the same manner without the wax or other resins, and the vinyl polymer A' can be analyzed as the vinyl polymer A.

<Method for Measuring Weight-Average Molecular Weight (Mw) of Resin>

The weight-average molecular weight (Mw) of a resin is measured by gel permeation chromatography (GPC) as described below.

First, a specimen is dissolved in tetrahydrofuran (THF) at room temperature for 24 hours. The solution is passed through a solvent-resistant membrane filter "Myshori Disk" (manufactured by Tosoh Corporation) with a pore size of 0.2 μm to prepare a sample solution. The sample solution is adjusted such that the concentration of a THF-soluble component is 0.8% by mass. The sample solution is subjected to measurement under the following conditions.

Apparatus: HLC8120 GPC (detector: RI) (manufactured by Tosoh Corporation)

Column: Shodex KF-801, 802, 803, 804, 805, 806, and 807 (manufactured by Showa Denko K.K.) in series Eluent: tetrahydrofuran (THF)

Flow rate: 1.0 mL/min

Oven temperature: 40.0° C.

Specimen injection volume: 0.10 mL

The molecular weight of the specimen is calculated from a molecular weight calibration curve, which is prepared using standard polystyrene resins (for example, trade name "TSK standard polystyrene F-850, F-450, F-288, F-128, F-80, F-40, F-20, F-10, F-4, F-2, F-1, A-5000, A-2500, A-1000, and A-500", manufactured by Tosoh Corporation).

<Molecular Weight Measurement of Wax>

The molecular weight of a release agent is measured by gel permeation chromatography (GPC) as described below. Special grade 2,6-di-t-butyl-4-methylphenol (BHT) is dissolved in o-dichlorobenzene for gel chromatography at a concentration of 0.10% by mass/volume at room temperature.

A release agent and the o-dichlorobenzene to which BHT is added are put in a sample bottle and are heated on a hot plate at 150° C. to dissolve the release agent. After the release agent is dissolved, the sample bottle is placed in a preheated filter unit and is placed in the main body. The sample passing through the filter unit is used as a GPC sample. The sample solution is adjusted to have a concentration of 0.15% by mass. The sample solution is subjected to measurement under the following conditions.

Apparatus: HLC-8121 GPC/HT (manufactured by Tosoh Corporation)

Detector: high-temperature RI

Column: Two TSKgel GMHHR-H HT (manufactured by Tosoh Corporation) columns in series Temperature: 135.0° C.

Solvent: o-dichlorobenzene for gel chromatography (containing 0.10% by mass/volume of BHT)

Flow rate: 1.0 mL/min

Injection volume: 0.4 mL

The molecular weight of the release agent is calculated from a molecular weight calibration curve, which is prepared using standard polystyrene resins (for example, trade name "TSK standard polystyrene F-850, F-450, F-288, F-128, F-80, F-40, F-20, F-10, F-4, F-2, F-1, A-5000, A-2500, A-1000, and A-500", manufactured by Tosoh Corporation).

<Method for Measuring Melting Point>

The melting point is measured with DSC Q1000 (manufactured by TA Instruments) under the following conditions.

Heating rate: 10° C./min

Starting temperature: 20° C.

Final temperature: 180° C.

The melting points of indium and zinc are used for the temperature correction of a detecting unit, and the heat of fusion of indium is used for calorimetric correction.

More specifically, 5 mg of the specimen is precisely weighed, is placed in an aluminum pan, and is subjected to differential scanning calorimetry. An empty silver pan is used as a reference.

The melting point is defined as the peak temperature of the maximum endothermic peak in the first temperature rise process.

For a plurality of peaks, the maximum endothermic peak is a peak at a maximum amount of heat absorbed.

<Measurement of Weight-Average Particle Diameter (D4) of Toner>

The weight-average particle diameter (D4) of toner is determined as described below. The measuring apparatus is a precision particle size distribution analyzer "Coulter Counter Multisizer 3" (registered trademark, manufactured by Beckman Coulter, Inc.) equipped with a 100-μm aperture tube utilizing an aperture impedance method. Accessory dedicated software "Beckman Coulter, Multisizer 3 Version 3.51" (manufactured by Beckman Coulter, Inc.) is used to set the measurement conditions and analyze measured data. The effective measuring channel number is 25,000.

An aqueous electrolyte used in the measurement may be 1% special grade sodium chloride dissolved in deionized water, for example, "ISOTON II" (manufactured by Beckman Coulter, Inc.).

Before the measurement and analysis, the dedicated software is set up as described below.

On the "Standard measurement method (SOMME) setting" screen of the dedicated software, the total count number in control mode is set at 50,000 particles, the number of measurements is set at 1, and the Kd value is set at a value obtained with "standard particles 10.0 μm" (manufactured by Beckman Coulter, Inc.). A "Threshold/noise level measurement button" is pushed to automatically set the threshold and noise level. The current is set at 1600 μA. The gain is set at 2. Isoton II is chosen as an electrolyte solution. "Flushing of aperture tube after measurement" is checked.

On the "Conversion of pulse into particle diameter" setting screen of the dedicated software, the bin interval is set to the logarithmic particle diameter, the particle diameter bin is set to a 256 particle diameter bin, and the particle diameter range is set at 2 to 60 μm.

The specific measurement method is described below.

(1) A 250-mL round-bottom glass beaker for Multisizer 3 is charged with 200.0 mL of the aqueous electrolyte and is placed on a sample stand. A stirrer rod is rotated counterclockwise at 24 revolutions per second. Soiling and air bubbles in the aperture tube are removed using the "Aperture tube flushing" function of the dedicated software.

(2) A 100-mL flat-bottom glass beaker is charged with 30.0 mL of the aqueous electrolyte. To the aqueous electrolyte is added 0.3 mL of a dispersant "Contaminon N" (a 10% aqueous neutral detergent for cleaning precision measuring instruments composed of a nonionic surfactant, an anionic surfactant, and an organic builder, pH 7, manufactured by Wako Pure Chemical Industries, Ltd.) diluted 3-fold by mass with deionized water.

(3) An ultrasonic disperser "Ultrasonic Dispersion System Tetra 150" (manufactured by Nikkaki-Bios Co., Ltd.) is prepared. The ultrasonic disperser includes two oscillators with an oscillation frequency of 50 kHz and has an electrical output of 120 W. The two oscillators have a phase difference of 180 degrees. A water tank of the ultrasonic disperser is charged with 3.3 L of deionized water, and 2.0 mL of Contaminon N is added to the deionized water.

(4) The beaker in (2) is placed in a beaker-holding hole in the ultrasonic disperser, and the ultrasonic disperser is actuated. The vertical position of the beaker is adjusted such that the surface resonance of the aqueous electrolyte in the beaker is highest.

(5) While the aqueous electrolyte in the beaker in (4) is exposed to ultrasonic waves, 10 mg of toner particles are added little by little to the aqueous electrolyte and are dispersed. The ultrasonic dispersion treatment is continued for another 60 seconds. During the ultrasonic dispersion, the water temperature of the water tank is controlled in the temperature range of 10° C. to 40° C.

(6) The aqueous electrolyte containing dispersed toner particles prepared in (5) is added dropwise with a pipette into the round-bottom beaker prepared in (1) placed on the sample stand such that the measurement concentration is 5%. Measurement is continued until the number of measured particles reaches 50,000.

(7) The measured data are analyzed using the accessory dedicated software to determine the weight-average particle diameter (D4). The "Average diameter" on the "Analysis/volume statistics (arithmetic mean)" screen in the setting of graph/volume percent in the dedicated software is the weight-average particle diameter (D4).

Exemplary Embodiments

Although the present disclosure is more specifically described in the following exemplary embodiments, the present disclosure is not limited to these exemplary embodiments. Unless otherwise specified, "part" in the following formulations is based on mass.

Measurement results in the exemplary embodiments were measured by the methods described above. The 50% particle size (D50) based on the volume distribution of a dispersion liquid was measured with a dynamic light scattering particle size distribution analyzer Nanotrac UPA-EX150 (manufactured by Nikkiso Co., Ltd.).

<Production Example of Shell Resin>

The following materials were put into an autoclave equipped with a decompression device, a water separator, a nitrogen gas introducing device, a temperature measuring device, and a stirrer.

Terephthalic acid 32.3 parts by mass (50.0% by mole)

2-mole propylene oxide adduct of bisphenol A 67.7 parts by mass (50.0% by mole)

Potassium titanium oxalate 0.02 parts

A reaction in a nitrogen atmosphere at atmospheric pressure and at 220° C. for 8 hours yielded an amorphous polyester as a shell resin. The shell resin had a weight-average molecular weight (hereinafter also referred to as Mw) of 20,000 and a glass transition temperature (Tg) of 70° C.

<Wax Used in Production of Toner>

Table 1 shows the type and physical properties of wax used to produce toner.

TABLE 1

| | Type of wax | Molecular weight | Melting point [° C.] |
|---|---|---|---|
| Wax 1 | dipentaerythritol hexabehenate | 2190 | 86 |
| Wax 2 | dipentaerythritol hexastearate | 1853 | 79 |
| Wax 3 | dipentaerythritol hexapalmitate | 1685 | 73 |
| Wax 4 | tripentaerythritol octabehenate | 2162 | 84 |
| Wax 5 | pentaerythritol tetrabehenate | 1426 | 76 |
| Wax 6 | glyceryl tribehenate | 1059 | 68 |
| Wax 7 | stearyl stearate | 537 | 62 |
| Wax 8 | hydrocarbon wax (HNP51, Nippon Seiro Co., Ltd.) | 469 | 78 |
| Wax 9 | hydrocarbon wax (Excerex 30050B, Mitsui Chemicals, Inc.) | 2700 | 91 |

<Production Example of Toner 1>

[Production of Toner by Suspension Polymerization Method]

Preparation of Toner Particles 1

The following materials were put into an attritor (manufactured by Nippon Coke & Engineering Co., Ltd.).

Methacrylonitrile (monomer (b)) 5.0 parts

Styrene (monomer (c)) 10.0 parts

Ethyl methacrylate (monomer (d)) 15.0 parts

Colorant Pigment Blue 15:3 6.5 parts

These materials were dispersed with zirconia beads 5 mm in diameter at 200 rpm for 2 hours to prepare a raw material dispersion liquid.

Separately, 735.0 parts of deionized water and 16.0 parts of trisodium phosphate 12-hydrate in a vessel equipped with a high-speed stirring homomixer (manufactured by Primix Corporation) and a thermometer were heated to 60° C. with stirring at 12,000 rpm. Subsequently, aqueous calcium chloride containing 9.0 parts of calcium chloride dihydrate dissolved in 65.0 parts of deionized water was poured into the vessel. The mixture was stirred at 60° C. at 12,000 rpm for 30 minutes. The pH of the mixture was adjusted to 6.0 with 10% hydrochloric acid. Thus, an aqueous medium was prepared in which a dispersion stabilizer containing hydroxyapatite was dispersed in water.

The raw material dispersion liquid was then transferred to a vessel equipped with a stirrer and a thermometer and was heated to 60° C. with stirring at 100 rpm. The following materials were added to the raw material dispersion liquid.

Behenyl acrylate (monomer (a)) 50.0 parts

Shell resin 4.0 parts

Wax 1 9.0 parts

After stirring at 60° C. at 100 rpm for 30 minutes, 5.0 parts of a polymerization initiator t-butylperoxy pivalate (manufactured by NOF Corporation: Perbutyl PV) was added to the dispersion liquid. The dispersion liquid was stirred for one minute and was poured into an aqueous medium stirred with the high-speed stirrer at 12,000 rpm. Stirring was continued with the high-speed stirrer at 60° C. for 20 minutes at 12,000 rpm to prepare a granulation liquid.

The granulation liquid was transferred to a reaction vessel equipped with a reflux condenser tube, a stirrer, a thermometer, and a nitrogen inlet and was heated to 70° C. with stirring at 150 rpm in a nitrogen atmosphere. A polymerization reaction was performed at 70° C. for 12 hours at 150 rpm to prepare a toner-particle dispersion liquid.

The toner-particle dispersion liquid was heated to 95° C., was stirred at 150 rpm at 95° C. for 1 hour, was cooled to 70° C. with stirring, and was heat-treated at 70° C. for 3 hours. After the heat treatment, the toner-particle dispersion liquid was cooled to 30° C. The pH of the toner-particle dispersion liquid was adjusted to 1.5 with diluted hydrochloric acid with stirring to dissolve the dispersion stabilizer. Subsequently, a solid component was filtered off, was sufficiently washed with deionized water, and was dried under vacuum at 30° C. for 24 hours to prepare toner particles 1 containing a polymer A1.

Figure 1:
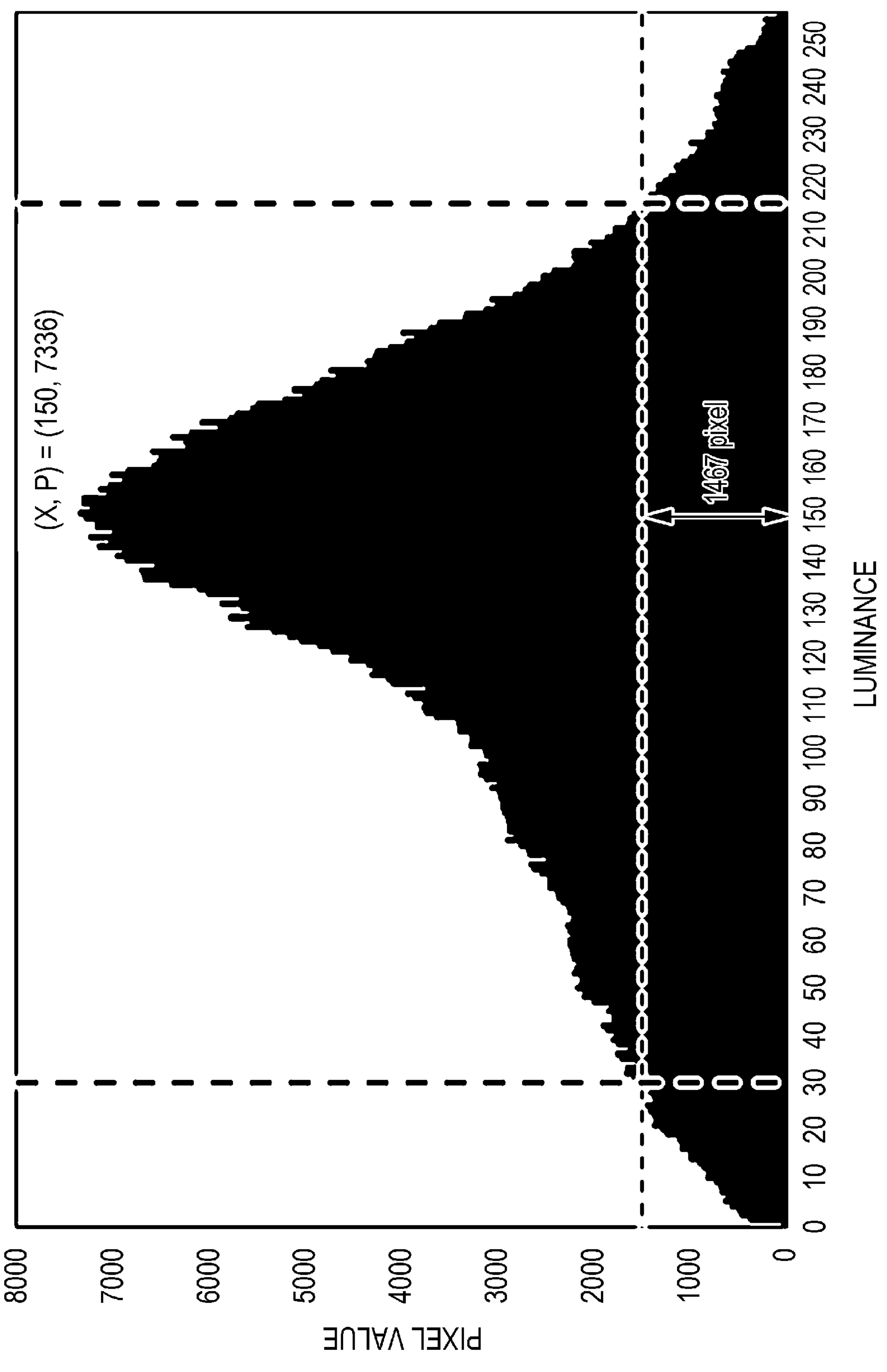
FIG. 1 is an example of a luminance histogram of 256 tones created from a cross-sectional image of a toner particle of toner 1 in an exemplary embodiment of the present disclosure.

100.0 parts of the toner particles 1 were mixed with 2.0 parts of external additive fine silica particles (hydrophobically treated with hexamethyldisilazane, number-average particle size of primary particles: 10 nm) in an FM mixer (manufactured by Nippon Coke & Engineering Co., Ltd.) at 3000 rpm for 15 minutes to prepare a toner 1. FIG. 1 shows one of ten luminance histograms of 256 tones obtained from an STEM image of a cross section of the toner 1. In FIG. 1, the luminance X was 150, P was 7336, the luminance M was 215, and the luminance N was 30. Tables 5 and 6 show physical properties of the toner 1.

<Production Examples of Toners 2 to 20 and 27 to 38>

The toners 2 to 20 and 27 to 38 were prepared in the same manner as the production example of the toner 1 except that the type and addition amount of monomer to be used were changed as shown in Table 2, and the type and addition amount of wax and the temperature and time of the heat treatment were changed as shown in Table 3. Tables 5 and 6 show physical properties of the toners 2 to 20 and 27 to 38.

FIG. 2 shows one of ten luminance histograms of 256 tones obtained from an STEM image of a cross section of the toner 35. In FIG. 2, the luminance X was 150, P was 15,709, the luminance M was 179, and the luminance N was 120.

TABLE 2

| | Monomer (a) | | Monomer (b) | | Monomer (c) | | Monomer (d) | |
|---|---|---|---|---|---|---|---|---|
| | Type | Parts by mass | Type | Parts by mass | Type | Parts by mass | Type | Parts by mass |
| Toner 1 | BEA | 50.0 | MN | 25.0 | St | 10.0 | ME | 15.0 |
| Toner 2 | STA | 50.0 | MN | 25.0 | St | 10.0 | ME | 15.0 |
| Toner 3 | OCA | 50.0 | MN | 25.0 | St | 10.0 | ME | 15.0 |
| Toner 4 | MYA | 50.0 | MN | 25.0 | St | 10.0 | ME | 15.0 |
| Toner 5 | BEA | 50.0 | MN | 25.0 | St | 10.0 | ME | 15.0 |
| Toner 6 | STA | 50.0 | MN | 25.0 | St | 10.0 | ME | 15.0 |
| Toner 7 | BEA | 50.0 | MN | 25.0 | St | 10.0 | ME | 15.0 |
| Toner 8 | BEA | 50.0 | MN | 25.0 | St | 10.0 | ME | 15.0 |
| Toner 9 | BEA | 50.0 | MN | 25.0 | St | 10.0 | ME | 15.0 |
| Toner 10 | BEA | 50.0 | MN | 25.0 | St | 10.0 | ME | 15.0 |
| Toner 11 | BEA | 50.0 | MN | 25.0 | St | 10.0 | ME | 15.0 |
| Toner 12 | BEA | 50.0 | MN | 25.0 | St | 10.0 | ME | 15.0 |
| Toner 13 | BEA | 50.0 | MN | 25.0 | St | 10.0 | ME | 15.0 |
| Toner 14 | BEA | 50.0 | MN | 25.0 | St | 10.0 | ME | 15.0 |
| Toner 15 | BEA | 50.0 | MN | 25.0 | St | 10.0 | ME | 15.0 |
| Toner 16 | BEA | 50.0 | MN | 25.0 | St | 10.0 | ME | 15.0 |
| Toner 17 | BEA | 18.0 | MN | 49.0 | St | 12.0 | ME | 21.0 |
| Toner 18 | BEA | 22.0 | MN | 47.0 | St | 11.0 | ME | 20.0 |
| Toner 19 | BEA | 78.0 | MN | 13.0 | St | 3.0 | ME | 6.0 |
| Toner 20 | BEA | 82.0 | MN | 11.0 | St | 2.0 | ME | 5.0 |
| Toner 27 | BEA | 50.0 | MN | 25.0 | St | 10.0 | ME | 15.0 |
| Toner 28 | BEA | 50.0 | MN | 25.0 | St | 10.0 | ME | 15.0 |
| Toner 29 | BEA | 50.0 | MN | 25.0 | St | 10.0 | ME | 15.0 |
| Toner 30 | BEA | 50.0 | MN | 25.0 | St | 10.0 | ME | 15.0 |
| Toner 31 | BEA | 50.0 | MN | 33.0 | St | 17.0 | — | — |
| Toner 32 | BEA | 50.0 | VA | 50.0 | — | — | — | — |
| Toner 33 | BEA | 50.0 | MN | 25.0 | VBA | 20.0 | — | — |
| Toner 34 | BEA | 50.0 | MN | 34.0 | St | 6.0 | AB | 10.0 |
| Toner 35 | BEA | 50.0 | MN | 25.0 | St | 10.0 | ME | 15.0 |
| Toner 36 | BEA | 67.0 | MN | 22.0 | St | 11.0 | — | — |
| Toner 37 | CEA | 50.0 | MN | 25.0 | St | 10.0 | ME | 15.0 |
| Toner 38 | BEA | 67.0 | MN | 22.0 | St | 11.0 | — | — |

Abbreviations in Table 2 are as follows:
BEA: behenyl acrylate
STA: stearyl acrylate
OCA: octacosyl acrylate
MYA: myristyl acrylate
CEA: cetyl acrylate
MN: methacrylonitrile
VA: vinyl acetate
St: styrene
VBA: vinyl benzoate
ME: ethyl methacrylate
AB: butyl acrylate

TABLE 3

| | Wax | | | | Heat treatment | |
|---|---|---|---|---|---|---|
| | Type | Parts by mass | Type | Parts by mass | Temperature [° C.] | Time [h] |
| Toner 1 | Wax 1 | 9.0 | — | — | 70.0 | 3.0 |
| Toner 2 | Wax 2 | 9.0 | — | — | 65.0 | 3.0 |
| Toner 3 | Wax 1 | 9.0 | — | — | 80.0 | 3.0 |
| Toner 4 | Wax 1 | 9.0 | — | — | 80.0 | 3.0 |
| Toner 5 | Wax 2 | 9.0 | — | — | 70.0 | 3.0 |
| Toner 6 | Wax 1 | 9.0 | — | — | 70.0 | 3.0 |
| Toner 7 | Wax 6 | 9.0 | — | — | 65.0 | 3.0 |
| Toner 8 | Wax 5 | 9.0 | — | — | 70.0 | 3.0 |
| Toner 9 | Wax 4 | 9.0 | — | — | 70.0 | 3.0 |
| Toner 10 | Wax 1 | 1.8 | — | — | 70.0 | 3.0 |
| Toner 11 | Wax 1 | 3.0 | — | — | 70.0 | 3.0 |
| Toner 12 | Wax 1 | 15.0 | — | — | 70.0 | 3.0 |
| Toner 13 | Wax 1 | 22.0 | — | — | 70.0 | 3.0 |
| Toner 14 | Wax 1 | 15.0 | — | — | — | — |
| Toner 15 | Wax 1 | 9.0 | — | — | 70.0 | 0.5 |
| Toner 16 | Wax 1 | 9.0 | — | — | 70.0 | 1.0 |
| Toner 17 | Wax 1 | 9.0 | — | — | 70.0 | 3.0 |
| Toner 18 | Wax 1 | 9.0 | — | — | 70.0 | 3.0 |
| Toner 19 | Wax 1 | 9.0 | — | — | 70.0 | 3.0 |

TABLE 3-continued

| | Wax | | | | Heat treatment | |
|---|---|---|---|---|---|---|
| | Type | Parts by mass | Type | Parts by mass | Temperature [° C.] | Time [h] |
| Toner 20 | Wax 1 | 9.0 | — | — | 70.0 | 3.0 |
| Toner 27 | Wax 1 | 7.0 | Wax 9 | 2 | 70.0 | 3.0 |
| Toner 28 | Wax 9 | 7.0 | Wax 1 | 2 | 70.0 | 3.0 |
| Toner 29 | Wax 1 | 5.0 | Wax 9 | 4 | 70.0 | 3.0 |
| Toner 30 | Wax 9 | 5.0 | Wax 1 | 4 | 70.0 | 3.0 |
| Toner 31 | Wax 1 | 9.0 | — | — | 70.0 | 3.0 |
| Toner 32 | Wax 1 | 9.0 | — | — | 70.0 | 3.0 |
| Toner 33 | Wax 1 | 9.0 | — | — | 70.0 | 3.0 |
| Toner 34 | Wax 1 | 9.0 | — | — | 70.0 | 3.0 |
| Toner 35 | Wax 8 | 9.0 | — | — | 70.0 | 3.0 |
| Toner 36 | Wax 3 | 9.0 | — | — | 70.0 | 3.0 |
| Toner 37 | Wax 3 | 9.0 | — | — | 70.0 | 3.0 |
| Toner 38 | Wax 3 | 9.0 | — | — | — | — |

In Table 3, the toners 14 and 38 were not heat-treated.

<Production Example of Toner 21>

Production Example of Polymer A2

The following materials were put into a reaction vessel equipped with a reflux condenser tube, a stirrer, a thermometer, and a nitrogen inlet in a nitrogen atmosphere.

Toluene 100.0 parts by mass

Monomer composition 100.0 parts by mass

The monomer composition was prepared by mixing behenyl acrylate, methacrylonitrile, ethyl methacrylate, and styrene at the following ratio.

Behenyl acrylate (monomer (a)) 50.0 parts by mass

Methacrylonitrile 25.0 parts by mass

Ethyl methacrylate 15.0 parts by mass

Styrene 10.0 parts by mass t-Butylperoxy pivalate (manufactured by NOF Corporation: Perbutyl PV) 0.5 parts The reaction vessel was heated to 70° C. with stirring at 200 rpm to perform a polymerization reaction for 12 hours, thereby preparing a solution of a polymer of the monomer composition dissolved in toluene. The solution was then cooled to 25° C. and was poured into 1000.0 parts of methanol with stirring to precipitate methanol insoluble matter. The methanol insoluble matter was filtered off, was washed with methanol, and was dried under vacuum at 40° C. for 24 hours to prepare a polymer A2.

[Production of Toner by Pulverization Process]

Polymer A2 100.0 parts by mass

Colorant Pigment Blue 15:3 (manufactured by Dainichiseika Color & Chemicals Mfg. Co., Ltd.) 6.5 parts by mass Wax 1 9.0 parts by mass Charge control agent (LR147: manufactured by Japan Carlit Co., Ltd.) 2.0 parts by mass These materials were premixed in the FM mixer (manufactured by Nippon Coke & Engineering Co., Ltd.) and were then melt-kneaded with a twin-screw extruder (PCM-30 manufactured by Ikegai Corporation) at a temperature of 120° C. and at a discharge temperature of 135° C. to prepare a kneaded product.

While the kneaded product was cooled, heat treatment was performed by holding the kneaded product at 95° C. for 1 hour and then at 70° C. for 3 hours. The kneaded product after the heat treatment was coarsely ground with a hammer mill and was then pulverized with a mechanical grinder (T-250 manufactured by Turbo Kogyo Co., Ltd.) to prepare a pulverized powder. The pulverized powder was classified with a multi-division classifier utilizing the Coanda effect to prepare toner particles 21 with a weight-average particle diameter (D4) of 7.0 μm.

100.0 parts of the toner particles 21 were mixed with 2.0 parts of external additive fine silica particles (hydrophobically treated with hexamethyldisilazane, number-average particle size of primary particles: 10 nm) in the FM mixer (manufactured by Nippon Coke & Engineering Co., Ltd.) at 3000 rpm for 15 minutes to prepare a toner 21. Tables 5 and 6 show physical properties of the toner 21.

<Production Example of Toner 22>

[Production of Toner by Emulsion Aggregation Method]

Preparation of Polymer A2 Dispersion Liquid

Toluene 300.0 parts by mass

Polymer A2 100.0 parts by mass

These materials were weighed and mixed, and the polymer A2 was dissolved at 90° C. to prepare a toluene solution.

Separately, 5.0 parts by mass of sodium dodecylbenzene sulfonate and 10.0 parts by mass of sodium laurate were added to 700.0 parts by mass of deionized water and were dissolved by heating at 90° C. to prepare an aqueous solution. The toluene solution and the aqueous solution were then mixed and stirred at 7000 rpm with an ultrahigh-speed stirrer T.K. Robomix (manufactured by Primix Corporation). Furthermore, emulsification was performed with a high-pressure impact disperser Nanomizer (manufactured by Yoshida Kikai Co., Ltd.) at a pressure of 200 MPa. The toluene was then removed with an evaporator, and the concentration was adjusted with deionized water to prepare a polymer A2 dispersion liquid containing 20% by mass of fine particles of the polymer A2.

The polymer A2 dispersion liquid had a 50% particle size (D50) of 0.40 μm based on the volume distribution.

Preparation of Wax Dispersion Liquid 1

Wax 1 100.0 parts by mass

Anionic surfactant Neogen RK (manufactured by Dai-ichi Kogyo Seiyaku Co., Ltd.) 5.0 parts by mass Deionized water 395.0 parts by mass These materials in a mixing vessel equipped with a stirrer was heated to 90° C. The materials were circulated to Clearmix W-motion (manufactured by M Technique Co., Ltd.) for dispersion treatment for 60 minutes. The conditions for the dispersion treatment are as follows:

Rotor outer diameter: 3 cm

Clearance: 0.3 mm

Rotor rotation speed: 19,000 rpm

Screen rotation speed: 19,000 rpm

After the dispersion treatment, the materials were cooled to 40° C. under the cooling conditions of a rotor rotation speed of 1000 rpm, a screen rotation speed of 0 rpm, and a cooling rate of 10° C./min to prepare a wax dispersion liquid 1 containing 20% by mass of fine particles of the wax 1.

The fine particles of the wax 1 had a 50% particle size (D50) of 0.15 μm based on the volume distribution.

Preparation of Colorant Dispersion Liquid 1

Colorant (Pigment Blue 15:3) 50.0 parts by mass

Anionic surfactant Neogen RK (manufactured by Dai-ichi Kogyo Seiyaku Co., Ltd.) 7.5 parts by mass Deionized water 442.5 parts by mass These materials were weighed, mixed, dissolved, and dispersed for 1 hour with the high-pressure impact disperser Nanomizer (manufactured by Yoshida Kikai Co., Ltd.) to prepare a colorant dispersion liquid 1 containing 10% by mass of fine particles of the colorant.

The fine particles of the colorant had a 50% particle size (D50) of 0.20 μm based on the volume distribution.

Preparation of Toner 22

The following materials were mixed in a round stainless steel flask.

Polymer A2 dispersion liquid 500.0 parts by mass

Wax dispersion liquid 1 45.0 parts by mass

Colorant dispersion liquid 1 80.0 parts by mass

Deionized water 160.0 parts by mass

The mixture was dispersed at 5000 rpm for 10 minutes with a homogenizer Ultra-Turrax T50 (manufactured by IKA). The pH of the mixture was adjusted to 3.0 with 1.0% aqueous nitric acid. The mixture was heated to 58° C. in a heating water bath while appropriately adjusting the rotation speed at which the mixture was stirred with stirring blades. When an agglomerate with a weight-average particle diameter (D4) of 6.0 μm was formed, the pH of the mixture was adjusted to 9.0 with 5% aqueous sodium hydroxide. The mixture was then heated to 75° C. with stirring. The agglomerate was fused by holding at 75° C. for 1 hour.

Subsequently, the temperature was increased to 90° C. and was then maintained at 90° C. for 1 hour and then at 70° C. for 3 hours to perform heat treatment.

The heat treatment was followed by cooling to 30° C., filtration, solid-liquid separation, and washing with deionized water. The washing was followed by drying with a vacuum dryer to prepare toner particles 22 with a weight-average particle diameter (D4) of 6.1 μm.

100.0 parts of the toner particles 22 were mixed with 2.0 parts of external additive fine silica particles (hydrophobically treated with hexamethyldisilazane, number-average particle size of primary particles: 10 nm) in the FM mixer (manufactured by Nippon Coke & Engineering Co., Ltd.) at 3000 rpm for 15 minutes to prepare a toner 22. Tables 5 and 6 show physical properties of the toner 22.

<Production Example of Toner 23>

[Production of Toner by Dissolution Suspension Method]

Preparation of Colorant Dispersion Liquid 2

The following materials were put into a heat-resistant glass vessel.

Colorant (Pigment Blue 15:3) 100.0 parts by mass

Ethyl acetate 150.0 parts by mass

Glass beads (1 mm) 200.0 parts by mass

After dispersion with a paint shaker for 5 hours, the glass beads were removed with a nylon mesh to prepare a colorant dispersion liquid 2. The colorant dispersion liquid 2 had a 50% particle size (D50) of 0.20 μm based on the volume distribution.

Preparation of Wax Dispersion Liquid 2

Wax 1 20.0 parts by mass

Ethyl acetate 80.0 parts by mass

These materials in a sealable reaction vessel were heated with stirring at 80° C. Subsequently, the system was cooled to 25° C. over 3 hours with gentle stirring at 50 rpm to prepare a milk white liquid.

The liquid was put into a heat-resistant vessel together with 30.0 parts by mass of glass beads 1 mm in diameter and was dispersed in a paint shaker (manufactured by Toyo Seiki Seisaku-Sho, Ltd.) for 3 hours. The glass beads were removed with a nylon mesh to prepare a wax dispersion liquid 2. The wax dispersion liquid 2 had a 50% particle size (D50) of 0.23 μm based on the volume distribution.

Preparation of Oil Phase

The following materials in a beaker were stirred at 3000 rpm for 1 minute with a disper mixer (manufactured by Tokushu Kika Kogyo Co., Ltd.).

Polymer A2 100.0 parts by mass

Ethyl acetate 85.0 parts by mass

The following materials were added to the beaker and were stirred at 6000 rpm for 3 minutes with the disper mixer (manufactured by Tokushu Kika Kogyo Co., Ltd.) to prepare an oil phase.

Wax dispersion liquid 2 (solid content: 20% by mass) 45.0 parts by mass

Colorant dispersion liquid 2 (solid content: 40% by mass) 12.5 parts by mass

Ethyl acetate 5.0 parts by mass

Preparation of Aqueous Phase

Aqueous sodium dodecyl diphenyl ether disulfonate (Eleminol MON7, manufactured by Sanyo Chemical Industries, Ltd.) 100.0 parts by mass Deionized water 900.0 parts by mass These materials in a beaker were stirred at 3000 rpm for 3 minutes with the disper mixer (manufactured by Tokushu Kika Kogyo Co., Ltd.) to prepare an aqueous phase.

Preparation of Toner 23

The oil phase was added to the aqueous phase and was dispersed at 10,000 rpm for 10 minutes with a T.K. homomixer (manufactured by Tokushu Kika Kogyo Co., Ltd.). The solvent was then removed at 30° C. under a reduced pressure of 50 mmHg for 30 minutes. The resulting slurry was heated and stirred at 90° C. for 1 hour. The slurry was then cooled to 70° C. and was heat-treated at 70° C. for 3 hours. After filtration, filtering off and redispersion in deionized water were performed five times to remove the surfactant and form a filter cake.

The filter cake was dried under vacuum and was then subjected to air classification to prepare toner particles 23.

The external addition to the toner particles 23 was performed in the same manner as the toner 1 to prepare a toner 23. Tables 5 and 6 show physical properties of the toner 23.

<Production Examples of Toners 24 to 26>

Preparation of Amorphous Resin 1

The following materials were put into a heat-dried two-neck flask while nitrogen was introduced into the flask.

Polyoxypropylene (2.2)-2,2-bis(4-hydroxyphenyl)propane 30.0 parts by mass

Polyoxyethylene (2.2)-2,2-bis(4-hydroxyphenyl)propane 33.0 parts by mass

Terephthalic acid 21.0 parts by mass

Dodecenylsuccinic acid 15.0 parts by mass

Dibutyltin oxide 0.1 parts by mass

The system was purged with nitrogen and was stirred at 215° C. for 5 hours. The temperature was then gradually increased to 230° C. under reduced pressure with stirring and was maintained for another 2 hours. Subsequently, the reaction was stopped by air cooling to prepare an amorphous polyester as an amorphous resin 1. The amorphous resin 1 had a weight-average molecular weight (Mw) of 23,500 and a glass transition temperature (Tg) of 55° C.

Preparation of Amorphous Resin Dispersion Liquid 1

The following materials were mixed and dissolved at 90° C.

Toluene 300.0 parts by mass

Amorphous resin 1 100.0 parts by mass

Separately, the following materials were mixed and dissolved at 90° C.

Deionized water 700.0 parts by mass

Sodium dodecylbenzene sulfonate 5.0 parts by mass

Sodium laurate 10.0 parts by mass

The resulting aqueous solution and the toluene solution were mixed and stirred at 7000 rpm with the ultrahigh-speed stirrer T.K. Robomix (manufactured by Primix Corporation). Furthermore, emulsification was performed with the high-pressure impact disperser Nanomizer (manufactured by Yoshida Kikai Co., Ltd.) at a pressure of 200 MPa. The toluene was then removed with an evaporator, and the concentration was adjusted with deionized water to prepare an amorphous resin 1 dispersion liquid containing 20% by mass of fine particles of the amorphous resin 1.

The fine amorphous resin particles had a 50% particle size (D50) of 0.38 μm based on the volume distribution.

[Production of Toner by Emulsion Aggregation Method]

Toners 24 to 26 were prepared in the same manner as in the production example of the toner 22 except that the addition amount of the polymer A2 dispersion liquid and the addition amount of the amorphous resin dispersion liquid 1 were changed as shown in Table 4. Tables 5 and 6 show physical properties of the toners 24 to 26.

matter. The methanol insoluble matter was filtered off, was washed with methanol, and was dried under vacuum at 40° C. for 24 hours to prepare a polymer A3.

Preparation of Polymer A3 Dispersion Liquid

Polymer A3 30 parts by mass

Sodium dodecylbenzene sulfonate 1.5 parts by mass

Deionized water 150 parts by mass

These materials were weighed, mixed, heated to 90° C., and stirred at 8000 rpm with the homogenizer (Ultra-Turrax T50, manufactured by IKA) to prepare a polymer A3 dispersion. The polymer A3 dispersion liquid had a 50% particle size (D50) of 0.30 μm based on the volume distribution.

Preparation of Amorphous Resin 2

The following materials were put into a heat-dried two-neck flask while nitrogen was introduced into the flask.

Polyoxyethylene (2,2)-2,2-bis(4-hydroxyphenyl)propane 19.0 parts by mass

Polyoxypropylene (2,2)-2,2-bis(4-hydroxyphenyl)propane 51.0 parts by mass

Terephthalic acid 23.0 parts by mass n-Dodecenylsuccinic acid 4.5 parts by mass

Isophthalic acid 3.0 parts by mass

Dibutyltin oxide 0.02 parts by mass

The system was purged with nitrogen and was heated to cause a reaction in the temperature range of 150° C. to 230° C. for approximately 12 hours. Subsequently, the pressure was gradually reduced in the temperature range of 210° C. to 250° C. to prepare an amorphous resin 2. The amorphous resin 2 had a weight-average molecular weight (Mw) of 15,400 and a glass transition temperature (Tg) of 65° C.

Preparation of Amorphous Resin 2 Dispersion Liquid

Amorphous resin 2 30 parts by mass

Ethyl acetate 100 parts by mass

TABLE 4

| | Polymer A2 dispersion liquid Parts by mass | Amorphous resin 1 dispersion liquid Parts by mass | Wax dispersion liquid 1 Parts by mass | Colorant dispersion liquid 1 Parts by mass | Physical properties Melting point [° C.] | Physical properties Weight-average particle diameter D4 [μm] |
|---|---|---|---|---|---|---|
| Toner 22 | 500.0 | 0.0 | 45.0 | 80.0 | 62 | 6.1 |
| Toner 24 | 190.0 | 310.0 | 45.0 | 80.0 | 56 | 5.9 |
| Toner 25 | 210.0 | 290.0 | 45.0 | 80.0 | 56 | 6.0 |
| Toner 26 | 400.0 | 100.0 | 45.0 | 80.0 | 61 | 6.1 |

<Production Example of Toner 39>

Preparation of Polymer A3

The following materials were put into a reaction vessel equipped with a reflux condenser tube, a stirrer, a thermometer, and a nitrogen inlet in a nitrogen atmosphere.

Toluene

Dodecanethiol

Monomer composition

The monomer composition was prepared by mixing behenyl acrylate and acrylic acid at the following ratio.

Behenyl acrylate (monomer (a)) 91.5 parts by mass

Acrylic acid 8.5 parts by mass

Azoisobutyronitrile (AIBN) 0.75 parts by mass

The reaction vessel was heated to 70° C. with stirring at 200 rpm to perform a polymerization reaction for 16 hours, thereby preparing a solution of a polymer of the monomer composition dissolved in toluene. The solution was then cooled to 25° C. and was poured into 1000.0 parts of methanol with stirring to precipitate methanol insoluble These materials were weighed and mixed to dissolve the amorphous resin 2. Furthermore, the following materials were added.

Sodium dodecylbenzene sulfonate 1.5 parts by mass

Deionized water 150 g

The mixture was heated to 60° C. and was stirred at 8000 rpm with the homogenizer (Ultra-Turrax T50, manufactured by IKA). The ethyl acetate was then evaporated to prepare an amorphous resin 2 dispersion liquid. The amorphous resin 2 dispersion liquid had a 50% particle size (D50) of 0.18 μm based on the volume distribution.

Preparation of Colorant Dispersion Liquid 3

Colorant (Pigment Blue 15:3) 50 parts by mass

Anionic surfactant Neogen SC (manufactured by Dai-ichi Kogyo Seiyaku Co., Ltd.) 5.0 parts by mass Deionized water 200.0 parts by mass These materials were mixed, dissolved, and dispersed with the homogenizer (Ultra-Turrax manufactured by IKA)

for 10 minutes to prepare a colorant dispersion 3 with a central particle size of 175 nm and with a solid content of 22.5 parts by mass.

Preparation of Wax Dispersion Liquid 3

Wax 7 25.0 parts by mass

Anionic surfactant Neogen SC (manufactured by Dai-ichi Kogyo Seiyaku Co., Ltd.) 5.0 parts by mass Deionized water 200.0 parts by mass These materials were mixed, heated to 97° C., and then dispersed with the homogenizer (Ultra-Turrax T50 manufactured by IKA). Dispersion treatment was then performed 20 times with a Gaulin homogenizer (manufactured by Meiwa Shoji) at 105° C. and at 550 kg/cm$^2$ to prepare a wax dispersion liquid 3. The wax dispersion liquid 3 had a 50% particle size (D50) of 0.20 μm based on the volume distribution.

Preparation of Toner 39

Amorphous resin 2 dispersion liquid 400.0 parts by mass

Polymer A3 dispersion liquid 100.0 parts by mass

Colorant dispersion liquid 3 20.0 parts by mass

Wax dispersion liquid 3 70.0 parts by mass

10% by mass aqueous solution of poly(aluminum chloride) (manufactured by Asada Chemical Industry Co., Ltd.) 1.5 parts by mass These materials were mixed and dispersed in a round stainless steel flask with the homogenizer (Ultra-Turrax T50 manufactured by IKA), were heated to 45° C. with stirring, and were maintained at 45° C. for 30 minutes.

Subsequently, the temperature of the contents was gradually increased to 55° C., and aqueous sodium hydroxide was added to adjust the pH to 8. The temperature was then increased to 90° C. to allow aggregates to coalesce for 1 hour. Thus, toner particles 39 were prepared after cooling and filtration, washing with deionized water, and drying.

100.0 parts of the toner particles 39 were mixed with 2.0 parts of external additive fine silica particles (hydrophobically treated with hexamethyldisilazane, number-average particle size of primary particles: 10 nm) in the FM mixer (manufactured by Nippon Coke & Engineering Co., Ltd.) at 3000 rpm for 15 minutes to prepare a toner 39. Tables 5 and 6 show physical properties of the toner 39.

TABLE 5

| | | | | Monomer unit A | | Wax | | |
|---|---|---|---|---|---|---|---|---|
| | Polymer A content of resin component [mass %] | Mw of polymer A | Melting point of polymer A | Unit A content of polymer A [mass %] | Number of carbon atoms in $R^2$ (Ac) | Ratio of wax to resin component [mass %] | Wc of ester wax | Valence of alcohol in ester wax |
| Toner 1 | 100.0 | 56000 | 62 | 50.0 | 22 | 9.0 | 21 | 6 |
| Toner 2 | 100.0 | 56800 | 54 | 50.0 | 18 | 9.0 | 17 | 6 |
| Toner 3 | 100.0 | 53400 | 77 | 50.0 | 28 | 9.0 | 21 | 6 |
| Toner 4 | 100.0 | 51800 | 76 | 50.0 | 30 | 9.0 | 21 | 6 |
| Toner 5 | 100.0 | 56300 | 61 | 50.0 | 22 | 9.0 | 17 | 6 |
| Toner 6 | 100.0 | 57100 | 55 | 50.0 | 18 | 9.0 | 21 | 6 |
| Toner 7 | 100.0 | 55800 | 60 | 50.0 | 22 | 9.0 | 21 | 3 |
| Toner 8 | 100.0 | 56100 | 61 | 50.0 | 22 | 9.0 | 21 | 4 |
| Toner 9 | 100.0 | 55900 | 64 | 50.0 | 22 | 9.0 | 21 | 8 |
| Toner 10 | 100.0 | 56500 | 62 | 50.0 | 22 | 1.8 | 21 | 6 |
| Toner 11 | 100.0 | 56300 | 62 | 50.0 | 22 | 3.0 | 21 | 6 |
| Toner 12 | 100.0 | 55700 | 63 | 50.0 | 22 | 15.0 | 21 | 6 |
| Toner 13 | 100.0 | 55000 | 63 | 50.0 | 22 | 22.0 | 21 | 6 |
| Toner 14 | 100.0 | 56200 | 63 | 50.0 | 22 | 15.0 | 21 | 6 |
| Toner 15 | 100.0 | 55900 | 62 | 50.0 | 22 | 9.0 | 21 | 6 |
| Toner 16 | 100.0 | 56000 | 63 | 50.0 | 22 | 9.0 | 21 | 6 |
| Toner 17 | 100.0 | 53900 | 55 | 18.0 | 22 | 9.0 | 21 | 6 |
| Toner 18 | 100.0 | 54500 | 55 | 22.0 | 22 | 9.0 | 21 | 6 |
| Toner 19 | 100.0 | 56500 | 63 | 78.0 | 22 | 9.0 | 21 | 6 |
| Toner 20 | 100.0 | 57400 | 64 | 82.0 | 22 | 9.0 | 21 | 6 |
| Toner 21 | 100.0 | 65400 | 64 | 50.0 | 22 | 9.0 | 21 | 6 |
| Toner 22 | 100.0 | 65400 | 62 | 50.0 | 22 | 9.0 | 21 | 6 |
| Toner 23 | 100.0 | 65400 | 64 | 50.0 | 22 | 9.0 | 21 | 6 |
| Toner 24 | 38.0 | 65400 | 59 | 50.0 | 22 | 9.0 | 21 | 6 |
| Toner 25 | 42.0 | 65400 | 59 | 50.0 | 22 | 9.0 | 21 | 6 |
| Toner 26 | 80.0 | 65400 | 61 | 50.0 | 22 | 9.0 | 21 | 6 |
| Toner 27 | 100.0 | 55500 | 62 | 50.0 | 22 | *9.0 | 21/— | 6/— |
| Toner 28 | 100.0 | 56800 | 65 | 50.0 | 22 | *9.0 | 21/— | 6/— |
| Toner 29 | 100.0 | 56100 | 63 | 50.0 | 22 | *9.0 | 21/— | 6/— |
| Toner 30 | 100.0 | 55900 | 63 | 50.0 | 22 | *9.0 | 21/— | 6/— |
| Toner 31 | 100.0 | 56300 | 64 | 50.0 | 22 | 9.0 | 21 | 6 |
| Toner 32 | 100.0 | 54000 | 59 | 50.0 | 22 | 9.0 | 21 | 6 |
| Toner 33 | 100.0 | 55300 | 61 | 50.0 | 22 | 9.0 | 21 | 6 |
| Toner 34 | 100.0 | 54800 | 59 | 50.0 | 22 | 9.0 | 21 | 6 |
| Toner 35 | 100.0 | 56300 | 62 | 50.0 | 22 | 9.0 | — | 0 |
| Toner 36 | 100.0 | 56500 | 64 | 50.0 | 22 | 9.0 | 15 | 6 |
| Toner 37 | 100.0 | 55000 | 51 | 50.0 | 16 | 9.0 | 15 | 6 |
| Toner 38 | 100.0 | 56500 | 58 | 67.0 | 22 | 9.0 | 15 | 6 |
| Toner 39 | 20.0 | 14800 | 66 | 91.0 | 22 | 12.0 | 17 | 1 |

*Toner 27: 7.0 parts of the wax 1 and 2.0 parts of wax 9

Toner 28: 2.0 parts of the wax 1 and 7.0 parts of the wax 9

Toner 29: 5.0 parts of the wax 1 and 4.0 parts of the wax 9

Toner 30: 4.0 parts of the wax 1 and 5.0 parts of the wax 9

In Table 5, Wc of the ester wax refers to the average number of carbon atoms in a linear alkyl group in the ester wax.

In Table 5, the melting point and Mw of the polymer A are the melting point and Mw of a polymer produced in the same manner as in the production example of the corresponding toner except that the shell resin, the wax, and the colorant were not added and that the step of mixing with the fine silica particles was not performed.

Because the polymer thus produced was produced in the same manner as in the resin contained in the corresponding toner, it was judged that the polymer had the same physical properties as the polymer A contained in the toner.

TABLE 6

| | \|Ac-Wc\| | Luminance M-luminance N | C/A | Melting point [° C.] | weight-average particle diameter D4 (µm) |
|---|---|---|---|---|---|
| Toner 1 | 1.0 | 172 | 0.010 | 62 | 6.1 |
| Toner 2 | 1.0 | 171 | 0.011 | 54 | 6.2 |
| Toner 3 | 7.0 | 129 | 0.039 | 77 | 5.9 |
| Toner 4 | 9.0 | 121 | 0.044 | 76 | 5.9 |
| Toner 5 | 5.0 | 163 | 0.025 | 61 | 6.0 |
| Toner 6 | 3.0 | 168 | 0.022 | 55 | 6.2 |
| Toner 7 | 1.0 | 123 | 0.002 | 60 | 5.8 |
| Toner 8 | 1.0 | 160 | 0.004 | 61 | 5.8 |
| Toner 9 | 1.0 | 182 | 0.024 | 64 | 6.3 |
| Toner 10 | 1.0 | 121 | 0.002 | 62 | 5.8 |
| Toner 11 | 1.0 | 129 | 0.003 | 62 | 5.8 |
| Toner 12 | 1.0 | 193 | 0.034 | 63 | 6.3 |
| Toner 13 | 1.0 | 198 | 0.081 | 63 | 6.4 |
| Toner 14 | 1.0 | 125 | 0.023 | 63 | 6.4 |
| Toner 15 | 1.0 | 141 | 0.004 | 62 | 6.2 |
| Toner 16 | 1.0 | 152 | 0.007 | 63 | 6.1 |
| Toner 17 | 1.0 | 121 | 0.080 | 55 | 5.5 |
| Toner 18 | 1.0 | 135 | 0.071 | 55 | 5.6 |
| Toner 19 | 1.0 | 182 | 0.008 | 63 | 6.3 |
| Toner 20 | 1.0 | 190 | 0.009 | 64 | 6.3 |
| Toner 21 | 1.0 | 173 | 0.009 | 64 | 7.0 |
| Toner 22 | 1.0 | 172 | 0.008 | 62 | 6.3 |
| Toner 23 | 1.0 | 172 | 0.012 | 64 | 6.3 |
| Toner 24 | 1.0 | 126 | 0.066 | 56 | 5.9 |
| Toner 25 | 1.0 | 128 | 0.062 | 56 | 6.0 |
| Toner 26 | 1.0 | 154 | 0.029 | 61 | 6.1 |
| Toner 27 | 1.0/— | 167 | 0.016 | 62 | 6.1 |
| Toner 28 | 1.0/— | 123 | 0.110 | 65 | 6.1 |
| Toner 29 | 1.0/— | 148 | 0.078 | 63 | 6.2 |
| Toner 30 | 1.0/— | 139 | 0.083 | 63 | 6.1 |
| Toner 31 | 1.0 | 167 | 0.011 | 64 | 5.9 |
| Toner 32 | 1.0 | 149 | 0.013 | 59 | 5.8 |
| Toner 33 | 1.0 | 165 | 0.009 | 61 | 6.1 |
| Toner 34 | 1.0 | 161 | 0.010 | 59 | 6.0 |
| Toner 35 | — | 75 | 0.145 | 62 | 5.8 |
| Toner 36 | 7.0 | 98 | 0.122 | 64 | 5.9 |
| Toner 37 | 1.0 | 131 | 0.011 | 51 | 6.4 |
| Toner 38 | 7.0 | 77 | 0.105 | 64 | 6.0 |
| Toner 39 | 5.0 | 85 | 0.136 | 66 | 6.4 |

Exemplary Embodiment 1

The toner 1 was examined as described below. Table 7 shows the evaluation results.

<Evaluation of Low-Temperature Fixability of Toner>

A laser beam printer (trade name: LBP-7700C, manufactured by CANON KABUSHIKI KAISHA) was modified to be used as an image-forming apparatus to evaluate the low-temperature fixability of toners. The printer was modified such that it can operate without the fixing unit and the fixing temperature can be set freely. An image was outputted on a white sheet (trade name: Fox River Bond (90 g/$m^2$), FOX RIVER).

First, toner was removed from the cartridge, and the cartridge was cleaned by air blowing. The cartridge was then filled with 300 g of the toner 1. The cartridge was left at a temperature of 25° C. and at a humidity of 40% RH for 48 hours and was then mounted in the cyan station of the printer at the same temperature and humidity. Dummy cartridges were mounted in the other stations. The evaluation was performed in the same environment as described above.

Subsequently, using the image-forming apparatus without the fixing unit, an unfixed image of an image pattern was outputted on a sheet. The image pattern was a 10 mm×10 mm square image transferred onto 9 intersection points of lines dividing each of the long side and the short side of the sheet into four equal parts. The toner bearing amount on the sheet was 0.80 mg/$cm^2$.

The unfixed image was fixed with the removed fixing unit at a process speed of 250 mm/s and at an initial temperature of 90° C. The temperature was increased in increments of 5° C. to form a fixed image at each temperature. The fixed image was rubbed with a lens-cleaning paper ["Dasper®" (Ozu Paper Co., Ltd.)] at a load of 50 g/$cm^2$. The image density was measured before and after the rubbing. The low-temperature fixability of toner was evaluated in terms of an initial fixing temperature at which the image density after the rubbing reached 20% or less of the image density before the rubbing. An initial fixing temperature of 120° C. or less was judged to have the advantages of the present disclosure. Table 7 shows the evaluation results.

<Evaluation of Endurance of Toner>

The releasability of toner was evaluated with the modified image-forming apparatus and the sheet used in the evaluation of low-temperature fixability in a normal temperature and normal humidity environment, that is, at a temperature of 25° C. and at a humidity of 40% RH. The endurance of toner was evaluated in terms of the soiling density of a non-image area due to a fine powder formed by cracking or chipping of the toner.

First, a full-white image was outputted at a process speed of 120 mm/s on an evaluation sheet with a sticky note attached under the center thereof. The soiling density Di (%) of the non-image area before the endurance test was the difference between the reflectivity D1(%) of a portion of the evaluation sheet covered with the sticky note and the reflectivity D2(%) of a portion not covered (Di=D2−D1(%)). The reflectivity was measured with "Reflectometer Model TC-6DS (manufactured by Tokyo Denshoku Co., Ltd.)" equipped with an amber filter.

Next, a horizontal line pattern with a printing ratio of 1% was outputted on two sheets during one job. The printer was temporarily stopped before the next job. A total of 15,000 images were outputted in this mode. The printer was turned off and left for 72 hours immediately after the completion of image output. The printer was then turned on again. The full-white image was outputted on an evaluation sheet with a sticky note attached under the center thereof, and the soiling density (Dr (%)) of the non-image area after the endurance test was calculated, as described above.

The endurance of the toner was evaluated in terms of (Dr−Di) calculated from the two values. Table 7 shows the evaluation results. A (Dr−Di) value of less than 4.0% was judged to have the advantages of the present disclosure.

<Evaluation of Releasability of Toner>

The releasability of toner was evaluated with the modified image-forming apparatus used in the evaluation of low-temperature fixability. A white sheet (trade name: GF-500 (A4, basis weight: 64.0 g/$m^2$, Canon Marketing Japan Inc.) was also used. The cartridge was filled with 300 g of the toner 1, as described above.

An unfixed image with 100 mm in width in the sheet passing direction and 200 mm in width in the direction perpendicular to the sheet passing direction was outputted on an evaluation sheet with a space of 1 mm from an edge thereof using the modified printer without the fixing unit. The sheet passing direction was the longitudinal direction, and the unfixed image had a toner bearing amount of 0.8 $mg/cm^2$.

The releasability of toner was evaluated with the removed fixing unit in terms of the number of temperatures at which the fixed image was not wound around a fixing roller while the temperature was increased six times in increments of 10° C. from the initial fixing temperature set for the evaluation of low-temperature fixability. Table 7 shows the evaluation results. At least one temperature at which the fixed image was not wound around the fixing roller was judged to have the advantages of the present disclosure.

<Evaluation of High-Temperature Storage Stability of Toner>

After 6 g of the toner 1 in a 100-mL polymer cup was left at a temperature of 50° C. and at a humidity of 20% RH for 10 days, the cohesion degree of the toner 1 was measured as described below.

The measuring apparatus was a digital display vibrometer "Digi-Vibro MODEL 1332A" (manufactured by Showa Sokki Corporation) coupled to a side surface of a shaking table of "Powder Tester" (manufactured by Hosokawa Micron Corporation). A sieve with an aperture of 38 μm (400 mesh), a sieve with an aperture of 75 μm (200 mesh), and a sieve with an aperture of 150 μm (100 mesh) were stacked in this order on the shaking table of the Powder Tester. The measurement was performed as described below at 23° C. and at 60% RH.

(1) The amplitude of vibration of the shaking table was adjusted in advance such that the displacement of the digital display vibrometer was 0.60 mm (peak-to-peak).

(2) The toner left for 10 days as described above was left at 23° C. and at 60% RH for 24 hours. Then 5 g of the toner was precisely weighed and was gently placed on the uppermost sieve with an aperture of 150 μm.

(3) After the sieve was vibrated for 15 seconds, the mass of the toner remaining on each sieve was measured, and the cohesion degree (%) was calculated using the following formula. Table 7 shows the evaluation results. A cohesion degree of 30% or less was judged to have the advantages of the present disclosure.

Cohesion degree (%)={(the mass of toner on the sieve with an aperture of 150 μm (g))/5 (g)}×100+{(the mass of toner on the sieve with an aperture of 75 μm (g))/5 (g)}×100×0.6+{(the mass of toner on the sieve with an aperture of 38 μm (g))/5 (g)}×100×0.2

TABLE 7

| | | Low-temperature fixability Initial fixing temperature [° C.] | Endurance (cracking or chipping) Dr-Di [%] | Releasability Number of temperatures without winding | High-temperature storage stability Cohesion degree [%] |
|---|---|---|---|---|---|
| Exemplary embodiment 1 | Toner 1 | 100 | 0.6 | 5 | 16 |
| Exemplary embodiment 2 | Toner 2 | 95 | 0.6 | 4 | 26 |
| Exemplary embodiment 3 | Toner 3 | 105 | 1.7 | 5 | 15 |
| Exemplary embodiment 4 | Toner 4 | 110 | 2.1 | 5 | 15 |
| Exemplary embodiment 5 | Toner 5 | 100 | 0.9 | 4 | 16 |
| Exemplary embodiment 6 | Toner 6 | 95 | 0.9 | 4 | 25 |
| Exemplary embodiment 7 | Toner 7 | 95 | 0.4 | 1 | 19 |
| Exemplary embodiment 8 | Toner 8 | 95 | 0.6 | 3 | 17 |
| Exemplary embodiment 9 | Toner 9 | 100 | 0.8 | 5 | 16 |
| Exemplary embodiment 10 | Toner 10 | 100 | 0.4 | 1 | 16 |
| Exemplary embodiment 11 | Toner 11 | 100 | 0.5 | 2 | 16 |
| Exemplary embodiment 12 | Toner 12 | 100 | 1.4 | 6 | 19 |
| Exemplary embodiment 13 | Toner 13 | 100 | 2.2 | 6 | 19 |
| Exemplary embodiment 14 | Toner 14 | 100 | 0.9 | 2 | 17 |
| Exemplary embodiment 15 | Toner 15 | 100 | 0.4 | 3 | 17 |
| Exemplary embodiment 16 | Toner 16 | 100 | 0.5 | 4 | 17 |
| Exemplary embodiment 17 | Toner 17 | 120 | 2.7 | 5 | 26 |
| Exemplary embodiment 18 | Toner 18 | 115 | 1.3 | 5 | 24 |
| Exemplary embodiment 19 | Toner 19 | 90 | 0.7 | 2 | 18 |
| Exemplary embodiment 20 | Toner 20 | 90 | 0.7 | 1 | 19 |
| Exemplary embodiment 21 | Toner 21 | 100 | 0.8 | 5 | 18 |
| Exemplary embodiment 22 | Toner 22 | 100 | 0.6 | 5 | 16 |
| Exemplary embodiment 23 | Toner 23 | 100 | 0.6 | 5 | 17 |
| Exemplary embodiment 24 | Toner 24 | 120 | 2.4 | 6 | 13 |
| Exemplary embodiment 25 | Toner 25 | 120 | 1.8 | 5 | 15 |
| Exemplary embodiment 26 | Toner 26 | 110 | 1.0 | 5 | 16 |
| Exemplary embodiment 27 | Toner 27 | 100 | 0.7 | 5 | 16 |
| Exemplary embodiment 28 | Toner 28 | 100 | 3.9 | 6 | 17 |
| Exemplary embodiment 29 | Toner 29 | 100 | 1.9 | 5 | 16 |
| Exemplary embodiment 30 | Toner 30 | 100 | 2.4 | 5 | 15 |
| Exemplary embodiment 31 | Toner 31 | 105 | 0.6 | 5 | 14 |
| Exemplary embodiment 32 | Toner 32 | 95 | 0.8 | 5 | 25 |
| Exemplary embodiment 33 | Toner 33 | 100 | 0.7 | 5 | 21 |
| Exemplary embodiment 34 | Toner 34 | 100 | 0.9 | 5 | 18 |
| Comparative example 1 | Toner 35 | 100 | 4.2 | 1 | 20 |
| Comparative example 2 | Toner 36 | 100 | 4.0 | 4 | 20 |
| Comparative example 3 | Toner 37 | 95 | 0.6 | 3 | 34 |
| Comparative example 4 | Toner 38 | 100 | 4.1 | 5 | 16 |
| Comparative example 5 | Toner 39 | 130 | 3.2 | 3 | 12 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-207876 filed Dec. 15, 2020, and Japanese Patent Application No. 2021-160969 filed Sep. 30, 2021, which are hereby incorporated by reference herein in their entirety.

What is claimed is:

1. A toner comprising a toner particle containing a resin component and a wax, wherein the resin component contains a vinyl polymer A having a monomer unit A represented by the formula (A):

(A)

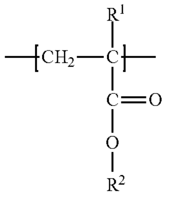

wherein $R^1$ denotes H or $CH_3$, and $R^2$ denotes an alkyl group having 18 to 36 carbon atoms, in scanning transmission electron microscopy observation of a cross section of the toner particle, a backscattered electron image of the cross section of the toner particle is acquired, a luminance of each pixel constituting the backscattered electron image is assigned to one of 256 tones in the luminance range of 0 to 255, and a luminance histogram with a horizontal axis representing the luminance and a vertical axis representing a pixel value is created, a total pixel value C in the luminance range of 0 to 9 and a total pixel value A in the luminance range of 0 to 245 satisfy the formula (1):

$$0.000 \leq C/A \leq 0.250 \qquad (1)$$

when the pixel value in the luminance range of 10 to 245 in the histogram has a maximum value P at a luminance X, luminance M-luminance N ranges from 150 to 235, wherein the luminance M denotes a luminance at which the pixel value falls below 20% of the maximum value P for the first time from the luminance X to the luminance of 245, and the luminance N denotes a luminance at which the pixel value falls below 20% of the maximum value P for the first time from the luminance X to the luminance of 10, and the wax is an ester wax which is an ester of a tetrahydric or higher polyhydric alcohol and an aliphatic monocarboxylic acid.

2. The toner according to claim 1, wherein C and A satisfy the formula (2)

$$0.000 \leq C/A \leq 0.100 \qquad (2).$$

3. The toner according to claim 1, wherein the monomer unit A content of the vinyl polymer A ranges from 20.0% to 80.0% by mass.

4. The toner according to claim 1, wherein the vinyl polymer A content of the resin component is 30.0% or more by mass.

5. The toner according to claim 1, wherein a number Ac of carbon atoms in the alkyl group denoted by $R^2$ in the monomer unit A and an average number Wc of carbon atoms in a linear alkyl group contained in the ester wax satisfy the formula (5)

$$|Ac - Wc| \leq 6.0 \qquad (5).$$

6. The toner according to claim 1, wherein the toner particle further contains a hydrocarbon wax.

7. The toner according to claim 1, wherein a mass ratio of the wax to the resin component ranges from 1.0% to 25.0% by mass.

8. The toner according to claim 1, wherein the wax has a molecular weight in the range of 1000 to 3000.

9. The toner according to claim 1, wherein the vinyl polymer A content of the resin component is 60% or more by mass.

10. A method for producing a toner, comprising the steps of:

producing a toner base particle containing the wax and the resin component; and producing the toner particle by heat treatment of the toner base particle in the temperature range of TmA to TmW for 30 minutes or more, wherein TmW denotes the melting point of the wax, and TmA denotes the melting point of the vinyl polymer A, and the toner comprises a toner particle containing a resin component and a wax, wherein the resin component contains a vinyl polymer A having a monomer unit A represented by the formula (A):

(A)

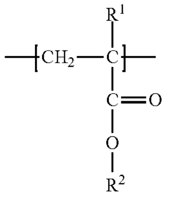

wherein $R^1$ denotes H or $CH_3$, and $R^2$ denotes an alkyl group having 18 to 36 carbon atoms, in scanning transmission electron microscopy observation of a cross section of the toner particle, a backscattered electron image of the cross section of the toner particle is acquired, a luminance of each pixel constituting the backscattered electron image is assigned to one of 256 tones in the luminance range of 0 to 255, and a luminance histogram with a horizontal axis representing the luminance and a vertical axis representing a pixel value is created, a total pixel value C in the luminance range of 0 to 9 and a total pixel value A in the luminance range of 0 to 245 satisfy the formula (1):

$$0.000 \leq C/A \leq 0.250 \qquad (1)$$

when the pixel value in the luminance range of 10 to 245 in the histogram has a maximum value P at a luminance X, luminance M-luminance N ranges from 150 to 235, wherein the luminance M denotes a luminance at which the pixel value falls below 20% of the maximum value P for the first time from the luminance X to the luminance of 245, and the luminance N denotes a luminance at which the pixel value falls below 20% of the maximum value P for the first time from the luminance X to the luminance of 10, and the wax is an ester wax which is an ester of a tetrahydric or higher polyhydric alcohol and an aliphatic monocarboxylic acid.

* * * * *